United States Patent
Sako et al.

(10) Patent No.: US 7,889,407 B2
(45) Date of Patent: Feb. 15, 2011

(54) METHOD FOR PRODUCING A DUPLICATE HOLOGRAM RECORDING MEDIUM, APPARATUS FOR PRODUCING A DUPLICATION MASTER, APPARATUS FOR PRODUCING A DUPLICATE HOLOGRAM RECORDING MEDIUM, AND DUPLICATION MASTER

(75) Inventors: Kageyasu Sako, Tokyo (JP); Tomiji Tanaka, Saitama (JP)

(73) Assignee: Sony Corporation, Tokyo (JP)

( * ) Notice: Subject to any disclaimer, the term of this patent is extended or adjusted under 35 U.S.C. 154(b) by 555 days.

(21) Appl. No.: 11/824,518

(22) Filed: Jun. 29, 2007

(65) Prior Publication Data

US 2008/0037088 A1 Feb. 14, 2008

(30) Foreign Application Priority Data

Jul. 21, 2006 (JP) .............................. 2006-199902

(51) Int. Cl.
*G03H 1/02* (2006.01)
*G03H 1/12* (2006.01)
*G03H 1/04* (2006.01)
*G03F 7/00* (2006.01)

(52) U.S. Cl. .............................. 359/27; 359/28; 359/11; 430/1; 430/2

(58) Field of Classification Search .................. 359/27, 359/28
See application file for complete search history.

(56) References Cited

U.S. PATENT DOCUMENTS

2004/0165518 A1* 8/2004 Horimai et al. ............... 369/94

2005/0151311 A1  7/2005 Shimizu
2006/0176532 A1* 8/2006 Toishi .......................... 359/24

FOREIGN PATENT DOCUMENTS

| EP | 1 679 699 A1 | 12/2006 |
| JP | 2004-226821 A | 8/2004 |
| JP | 2008-015177 | 1/2008 |
| JP | 2008-015181 | 1/2008 |
| WO | WO 2005-038789 A1 | 4/2005 |

OTHER PUBLICATIONS

Horimai et al., "Holographic Medium Ready for Taking Off, Turning Gigabytes Storage Capacity Into Reality in 2006", Nikkei Electronics Jan. 17, 2005. P106-114.
Mok et al., "Holographic Read Only Memory", Holographic Data Storage, Optical Sciences, Springer-Verlag, Eds., New York, 2000, pp. 99-106.

* cited by examiner

*Primary Examiner*—Stephone B Allen
*Assistant Examiner*—Jade R Chwasz
(74) *Attorney, Agent, or Firm*—Robert J. Depke; Rockey, Depke & Lyons, LLC

(57) ABSTRACT

An apparatus for producing a duplicate hologram recording medium includes: a positioning section configured to place the duplication master and the duplicate hologram recording medium at predetermined relative positions; an angle selective plate arranged between the duplication master and the duplicate hologram recording medium, the angle selective plate having an angle selective film whose transmittance changes in accordance with an incidence angle of a light beam; and a duplicating-reference-beam generating and radiating section generating a duplicating reference beam, and radiating the duplicating reference beam at such an incidence angle that the duplicating reference beam is transmitted through a predetermined region of a recording layer of the duplication master and is reflected by the angle selective film.

9 Claims, 17 Drawing Sheets

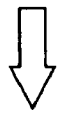

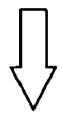

METHOD FOR PRODUCING A DUPLICATE HOLOGRAM RECORDING MEDIUM, APPARATUS FOR PRODUCING A DUPLICATION MASTER, APPARATUS FOR PRODUCING A DUPLICATE HOLOGRAM RECORDING MEDIUM, AND DUPLICATION MASTER

CROSS REFERENCES TO RELATED APPLICATIONS

The present invention contains subject matter related to Japanese Patent Application JP 2006-199902 filed in the Japanese Patent Office on Jul. 21, 2006, the entire contents of which are incorporated herein by reference.

BACKGROUND OF THE INVENTION

1. Field of the Invention

The present invention relates to a method for producing a duplicate hologram recording medium, an apparatus for producing a duplication master, an apparatus for producing a duplicate hologram recording medium, and a duplication master.

2. Description of the Related Art

In recent years, a holographic memory has been attracting attention as a data storage device that can achieve high recording density and enables recording and reproduction of recording data at high transfer rate. In a holographic memory, by making use of also the thickness direction of a recording medium, at the time of recording, the interference fringes between a reference beam and a signal beam are formed in a hologram recording medium as holograms on the basis of page data corresponding to recording data with two-dimensional information as one page unit, thereby performing recording at once in a three-dimensional manner. Further, at the time of reproduction, diffracted beams generated upon radiating reference beams to the holograms thus formed are obtained to thereby reproduce recording data (see Japanese Unexamined Patent Application Publication No. 2004-226821, and Nikkei Electronics, Jan. 17, 2005, pp. 106-114).

On the other hand, data storage devices based on the CD (Compact Disc) format or the DVD (Digital Versatile Disc) format are currently in widespread use. In these techniques, not only recording media that permit additional writing or rewriting to the media but also ROM media (Read Only Media) that can be mass-duplicated for distribution, such as a CD-ROM and a DVD-ROM, are being widely used. In a CD-ROM or a DVD-ROM, there is adopted a method in which an original disk for duplication, that is, a master disk is prepared, or a mother disk is further prepared from the master disk, and with the master disk or mother disk as the original disk, resin is poured into a mold made from this original disk to perform molding, thereby mass-producing CD-ROMs or DVD-ROMs as the replicas of the original disk.

For hologram recording media as well, like the CD-ROMs or DVD-ROMs described above, mass duplication of hologram recording media with holograms of the same shape formed therein has been considered. Such a technique is disclosed in International Publication WO 2005/038789A1. International Publication WO 2005/038789A1 discloses a method of recording optical information into an optical information recording medium that serves as the original for mass duplication of a hologram recording medium on which holograms have been recorded, a method of recording optical information into another optical recording information medium using such an optical recording information medium serving as the original. The key technical point for such a technique is how to enable high-speed recording to a large quantity of duplicate optical recording information media.

According to International Publication WO 2005/038789A1, in view of the above-mentioned point, the following method is employed as the method of recording optical information into an optical information recording medium that serves as an original for duplication. That is, a virtual information beam including an information beam carrying information and a recording reference beam is generated, and the virtual information beam and a virtual recording reference beam are radiated to the optical information recording medium. Further, as for the method of recording optical information into a duplicate optical information recording medium, there is described a technique in which a virtual reconstruction reference beam is radiated to an optical information recording medium that serves as an original, and a virtual information beam generated from the optical information recording medium serving as an original is radiated to an optical information recording medium, and there is disclosed a technique in which virtual information beams are radiated to an optical information recording medium at once using a large-aperture objective lens.

Further, in F. Mok "Holographic Read-Only Memory" in Holographic Data Storage, H. J. Coufal, D. Psaltis, and G. Sincerbox, eds., (Springer-Verlag, New York, 2000), there is disclosed a technique of duplicating a replica by arranging a master (original disk) and a replica (duplicate disk) adjacent to each other, and making a reconstruction reference beam and a replica-transfer reference beam common.

SUMMARY OF THE INVENTION

In the optical information recording method disclosed in International Publication WO 2005/038789A1, when recording to a large quantity of duplicate optical recording information media at high speed, it is required to enlarge the diameter of the objective lens in accordance with the size of the duplicate optical recording information media. However, it is extremely difficult to manufacture a high-resolution large-aperture objective lens, and hence an objective lens with a large diameter is expensive. For these reasons, there are difficulties in adopting the optical information recording method described above. It is thus desirable to provide an apparatus for producing a duplication master for a duplicate hologram recording medium, an apparatus for producing a duplicate hologram recording medium, and a duplication master, which enable the production of a duplicate optical recording information medium at higher speed using less expensive production equipment than in the related art. Further, it is also desirable to provide a method for producing a duplicate hologram recoding medium which is simpler but enables production at higher speed than in the related art.

According to an embodiment of the present invention, there is provided an apparatus for producing a duplication master used for duplicating a hologram carrying recording data onto a duplicate hologram recording medium, including: a beam splitter that splits a light beam from a laser light source into a coaxial beam and a master-producing reference beam; a spatial light modulator that performs spatial light modulation on the coaxial beam to generate a modulated coaxial beam in which a predetermined reference beam and a signal beam corresponding to recording data are arranged coaxially; condenser means for condensing the modulated coaxial beam to a recording layer of the duplication master while correcting for an aberration generated when duplicating the duplicate hologram recording medium in advance; and hologramforming-position moving means for moving a position of the recording layer where a hologram is formed due to interference between the master-producing reference beam and the modulated coaxial beam.

In the above-mentioned apparatus for producing a duplication master, the beam splitter splits a light beam from the laser light source into a coaxial beam and a master-producing reference beam. The spatial light modulator performs spatial light modulation on the coaxial beam to generate a modulated coaxial beam in which a predetermined reference beam and a signal beam corresponding to recording data are arranged coaxially. The condenser means condenses the modulated coaxial beam to the recording layer of the duplication master while correcting for an aberration that is generated when duplicating a duplicate hologram recording medium in advance. The hologram-forming-position moving means moves the position of the recording layer where a hologram is formed due to interference between the master-producing reference beam and the modulated coaxial beam.

According to an embodiment of the present invention, there is provided an apparatus for producing a duplication master used for duplicating a hologram carrying recording data onto a duplicate hologram recording medium, including: a beam splitter that splits a light beam from a laser light source into a coaxial beam and a master-producing reference beam; a spatial light modulator that performs spatial light modulation on the coaxial beam to generate a modulated coaxial beam in which a predetermined reference beam and a signal beam corresponding to recording data are arranged coaxially; condenser means for condensing the modulated coaxial beam to a recording layer of the duplication master; and hologram-forming-position moving means for moving a position of the recording layer where a hologram is formed due to interference between the master-producing reference beam and the modulated coaxial beam. The duplication master has a recording layer in which a hologram is recorded, and a polarization-dependent angle selective film, the polarization-dependent angle selective film being configured to have a transmittance sufficient for forming the hologram with respect to a light beam having a predetermined polarization direction irrespective of an incidence angle, and to have a transmittance that changes in accordance with an incidence angle of a light beam with respect to a polarization direction different from the predetermined polarization direction. The master-producing reference beam and the modulated coaxial beam that are polarized in the predetermined polarization direction are radiated to the above-mentioned duplication master.

In the above-mentioned apparatus for producing a duplication master, the beam splitter splits a light beam from the laser light source into a coaxial beam and a master-producing reference beam. The spatial light modulator performs spatial light modulation on the coaxial beam to generate a modulated coaxial beam in which a predetermined reference beam and a signal beam corresponding to recording data are arranged coaxially. The condenser means condenses the modulated coaxial beam to the recording layer of the duplication master. The hologram-forming-position moving means moves the position of the recording layer where a hologram is formed due to interference between the master-producing reference beam and the modulated coaxial beam. Further, the duplication master for recording a hologram has a recording layer and a polarization-dependent angle selective film. Here, the polarization-dependent angle selective film has such a property that the polarization-dependent angle selective film has a transmittance sufficient for forming the hologram with respect to a light beam of a predetermined polarization direction irrespective of an incidence angle, and has a transmittance that changes in accordance with an incidence angle of a light beam with respect to a polarization direction different from the predetermined polarization direction. The master-producing reference beam and the modulated coaxial beam that are polarized in the predetermined polarization direction are radiated to the above-mentioned duplication master to thereby form a hologram on the duplication master.

According to an embodiment of the present invention, there is provided an apparatus for producing a duplicate hologram recording medium, which duplicates a hologram carrying recording data and formed on a duplication master onto a duplicate hologram recording medium, including: positioning means for placing the duplication master and the duplicate hologram recording medium at predetermined relative positions; an angle selective plate arranged between the duplication master and the duplicate hologram recording medium, the angle selective plate having an angle selective film whose transmittance changes in accordance with an incidence angle of a light beam; and duplicating-reference-beam generating and radiating means for generating a duplicating reference beam, and radiating the duplicating reference beam at such an incidence angle that the duplicating reference beam is transmitted through a predetermined region of a recording layer of the duplication master and is reflected by the angle selective film.

In the above-mentioned apparatus for producing a duplicate hologram recording medium, the positioning means places the duplication master and the duplicate hologram recording medium at predetermined relative positions. The angle selective plate is arranged between the duplication master and the duplicate hologram recording medium, and has an angle selective film whose transmittance changes in accordance with the incidence angle of a light beam. The duplicating-reference-beam generating and radiating means generates a duplicating reference beam, and radiates the duplicating reference beam at such an incidence angle that the duplicating reference beam is transmitted through a predetermined region of a recording layer of the duplication master and is reflected by the angle selective film.

According to an embodiment of the present invention, there is provided an apparatus for producing a duplicate hologram recording medium, which duplicates a hologram carrying recording data and formed on a duplication master onto a duplicate hologram recording medium, including: positioning means for placing the duplication master and the duplicate hologram recording medium at predetermined relative positions; a polarization-dependent angle selective plate arranged between the duplication master and the duplicate hologram recording medium and having a polarization-dependent angle selective film, the polarization-dependent angle selective film being configured to have a transmittance sufficient for forming a hologram on the duplicate hologram recording medium with respect to a light beam having a predetermined polarization direction irrespective of an incidence angle, and to have a transmittance that changes in accordance with an incidence angle of a light beam with respect to a polarization direction different from the predetermined polarization direction; and duplicating-reference-beam generating and radiating means for generating a duplicating reference beam, and radiating the duplicating reference beam having a polarization direction different from the predetermined polarization direction at such an incidence angle that the duplicating reference beam is transmitted through a predetermined region of a recording layer of the duplication master and is reflected by the polarization-dependent angle selective film.

In the above-mentioned apparatus for producing a duplicate hologram recording medium, the positioning means places the duplication master and the duplicate hologram recording medium at predetermined relative positions. The polarization-dependent angle selective plate is arranged between the duplication master and the duplicate hologram recording medium. Further, the polarization-dependent angle selective plate has a polarization-dependent angle selective film that is configured to have a transmittance sufficient for forming a hologram on the duplicate hologram recording medium with respect to a light beam having a predetermined polarization direction irrespective of an incidence angle, and to have a transmittance that changes in accordance with an incidence angle of a light beam with respect to a polarization direction different from the predetermined polarization direction. The duplicating-reference-beam generating and radiating means generates a duplicating reference beam, and radiates the duplicating reference beam having a polarization direction different from the predetermined polarization direction at such an incidence angle that the duplicating reference beam is transmitted through a predetermined region of a recording layer of the duplication master and is reflected by the polarization-dependent angle selective film.

According to an embodiment of the present invention, there is provided a disc-shaped duplication master used for duplicating a hologram carrying recording data onto a duplicate hologram recording medium, including: a recording layer in which the hologram has been formed; and a polarization-dependent angle selective film configured to have a transmittance sufficient for forming the hologram with respect to a light beam having a predetermined polarization direction irrespective of an incidence angle, and to have a transmittance that changes in accordance with an incidence angle of a light beam with respect to a polarization direction different from the predetermined polarization direction.

In the duplication master according to the above-mentioned embodiment, a hologram is formed in the recording layer. The polarization-dependent angle selective film has a transmittance sufficient for forming the hologram with respect to a light beam having a predetermined polarization direction irrespective of an incidence angle, and has a transmittance that changes in accordance with an incidence angle of a light beam with respect to a polarization direction different from the predetermined polarization direction.

According to an embodiment of the present invention, there is provided a method for producing a duplicate hologram recording medium, in which a hologram carrying recording data and formed on a duplication master is duplicated onto a duplicate hologram recording medium, including the steps of: placing an angle selective film between a recording layer of the duplication master and a recording layer of the duplicate hologram recording medium, the angle selective film being configured to have a transmittance that changes in accordance with an incidence angle of a light beam; and radiating a duplicating reference beam at such an incident angle that the duplicating reference beam is transmitted through a recording layer of the duplication master in which a hologram has been formed, and is reflected by the angle selective film.

In the method for producing a duplicate hologram recording medium according to the above-mentioned embodiment, an angle selective film, whose transmittance changes in accordance with an incidence angle of a light beam, is arranged between a recording layer of the duplication master and a recording layer of the duplicate hologram recording medium. A duplicating reference beam is radiated at such an incident angle that the duplicating reference beam is transmitted through a recording layer of the duplication master in which a hologram is formed, and is reflected by the angle selective film.

According to an embodiment of the present invention, there is provided a method for producing a duplicate hologram recording medium, in which a hologram carrying recording data and formed on a duplication master is duplicated onto a duplicate hologram recording medium, including the steps of: placing a polarization-dependent angle selective film between a recording layer of the duplication master and a recording layer of the duplicate hologram recording medium, the polarization-dependent angle selective film being configured to have a transmittance sufficient for forming a hologram on the duplicate hologram recording medium with respect to a light beam having a predetermined polarization direction irrespective of an incidence angle, and to have a transmittance that changes in accordance with an incidence angle of a light beam with respect to a polarization direction different from the predetermined polarization direction; and radiating a duplicating reference beam having a polarization direction different from the predetermined polarization direction at such an incidence angle that the duplicating reference beam is transmitted through a recording layer of the duplication master in which a hologram has been formed, and is reflected by the polarization-dependent angle selective film.

In the method for producing a duplicate hologram recording medium according to the above-mentioned embodiment, a polarization-dependent angle selective film, which has a transmittance sufficient for forming the hologram with respect to a light beam having a predetermined polarization direction irrespective of an incidence angle and has a transmittance that changes with respect to a polarization direction different from the predetermined polarization direction in accordance with an incidence angle of a light beam, is placed between a recording layer of the duplication master and a recording layer of the duplicate hologram recording medium. A duplicating reference beam having a polarization direction different from the predetermined polarization direction is radiated at such an incidence angle that the duplicating reference beam is transmitted through a recording layer of the duplication master in which a hologram is formed, and is reflected by the polarization-dependent angle selective film.

The present invention can provide an apparatus for producing a duplication master for a duplicate hologram recording medium, an apparatus for producing a duplicate hologram recording medium, and a duplication master, which enable the production of a duplicate optical recording information medium at high speed using inexpensive production equipment, and can further provide a method for producing a duplicate hologram recoding medium which is simple but enables production at high speed.

DESCRIPTION OF THE PREFERRED EMBODIMENTS

Embodiments of the present invention will now be described in order. First, prior to the description of embodiments, a brief description will be given of an example of a coaxial-type hologram recording and reproduction apparatus having a coaxial optical system. This hologram recording and reproduction apparatus is an apparatus that records a hologram corresponding to recording data onto a hologram recording medium, and reproducing recording data from a hologram carrying recording data of a hologram recording medium. Next, as the description of embodiments, description will be given of an apparatus and method for producing a duplication master for a hologram recording medium, and a duplication master suitably used for the apparatus and method. Further, an apparatus for producing a duplicate hologram recording medium and a method for producing a duplicate hologram recording medium which use such a duplication master will be described. Lastly, several modifications of these embodiments will be described. Although the meaning of the term "duplicate hologram recording medium" will be described in detail below, in summary, a duplicate hologram recording medium refers to a hologram recording medium on which a hologram carrying recording data of a duplication master has been duplicated, and examples of such a hologram recording medium include both a hologram recording medium that functions only as a ROM (Read Only Memory), and a hologram recording medium that also has an area permitting an additional write, in addition to the ROM area.

(Coaxial-Type Hologram Recording and Reproduction Apparatus)

In a coaxial-type hologram recording and reproduction apparatus, a signal beam and a reference beam that will be described later are arranged coaxially, and due to such arrangement, at least some of optical parts constituting each of the optical path through which the signal beam passes and the optical path through which the reference beam passes are made common. Since recording to and reproduction from a hologram recording medium including a duplicate hologram recording medium can be performed due to such a configuration, the optical section of a hologram recording and reproduction apparatus (hereinafter, also abbreviated as recording and reproduction apparatus) can be simplified. Such a coaxial-type hologram recording and reproduction apparatus has been attracting attention as a promising future recording and reproduction apparatus because it is relatively easy to assure compatibility with existing optical discs such as CDs and DVDs.

Figure 1:
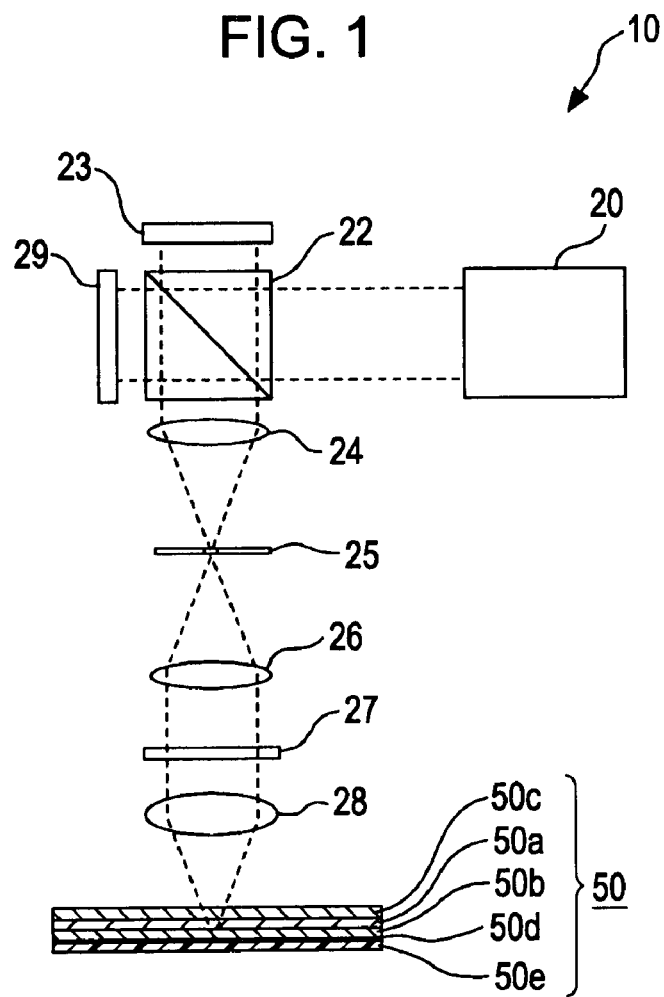
FIG. 1 is a conceptual view of an optical section as the main portion of a coaxial-type hologram recording apparatus.

FIG. 1 is a conceptual view of an optical section 10 as a main portion of a coaxial-type hologram recording apparatus. The optical section 10 includes, as its main optical parts, a laser light source 20, a polarization beam splitter 22, a spatial light modulator 23 formed by liquid crystal or the like, a Fourier transform lens 24, an iris 25, a Fourier transform lens 26, a ¼ wavelength plate 27, and an objective lens 28. In this case, the laser light source 20 has a single-mode laser, an anamorphic prism, a power monitor, an isolator, a shutter, and a spatial filter (none of which is shown).

The single-mode laser of the laser light source 20 is, for example, an external resonator type laser, and emits a single-mode light beam. The beam profile of the light beam undergoes shaping as the light beam passes through the anamorphic prism, the light beam intensity is measured as the light beam passes through the power monitor, return light to the single-mode laser is blocked as the light beam passes through the isolator, a control as to whether or not the light beam is to pass through subsequent optical parts is performed as the light beam passes through the shutter on the basis of whether the shutter is ON or OFF, and the aberration is corrected as the light beam passes through the spatial filter. The resulting light beam thus has good wavelength characteristics.

Further, the light beam passes through the following optical path formed by the optical parts shown in FIG. 1. The light beam is reflected by the polarization beam splitter 22 and radiated to the spatial light modulator 23. Then, a light beam that has been modulated in accordance with a pattern displayed on the spatial light modulator 23 is reflected. The polarization direction of the light beam changes by π/2 upon reflection by the spatial light modulator 23. In this regard, the spatial light modulator 23 has two light-beam reflecting regions including a signal-beam spatial light modulating section that displays a signal beam pattern based on recording data, and a reference-beam spatial light modulating section that displays a reference beam pattern.

Figure 2:
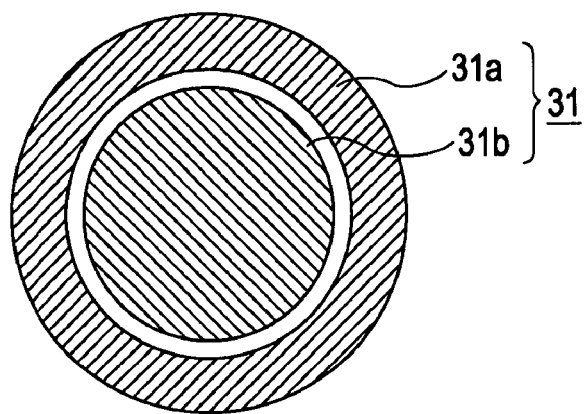
FIG. 2 is a view showing a reference-beam spatial light modulating section and signal-beam spatial light modulating section of a spatial light modulator.
Figure 3:
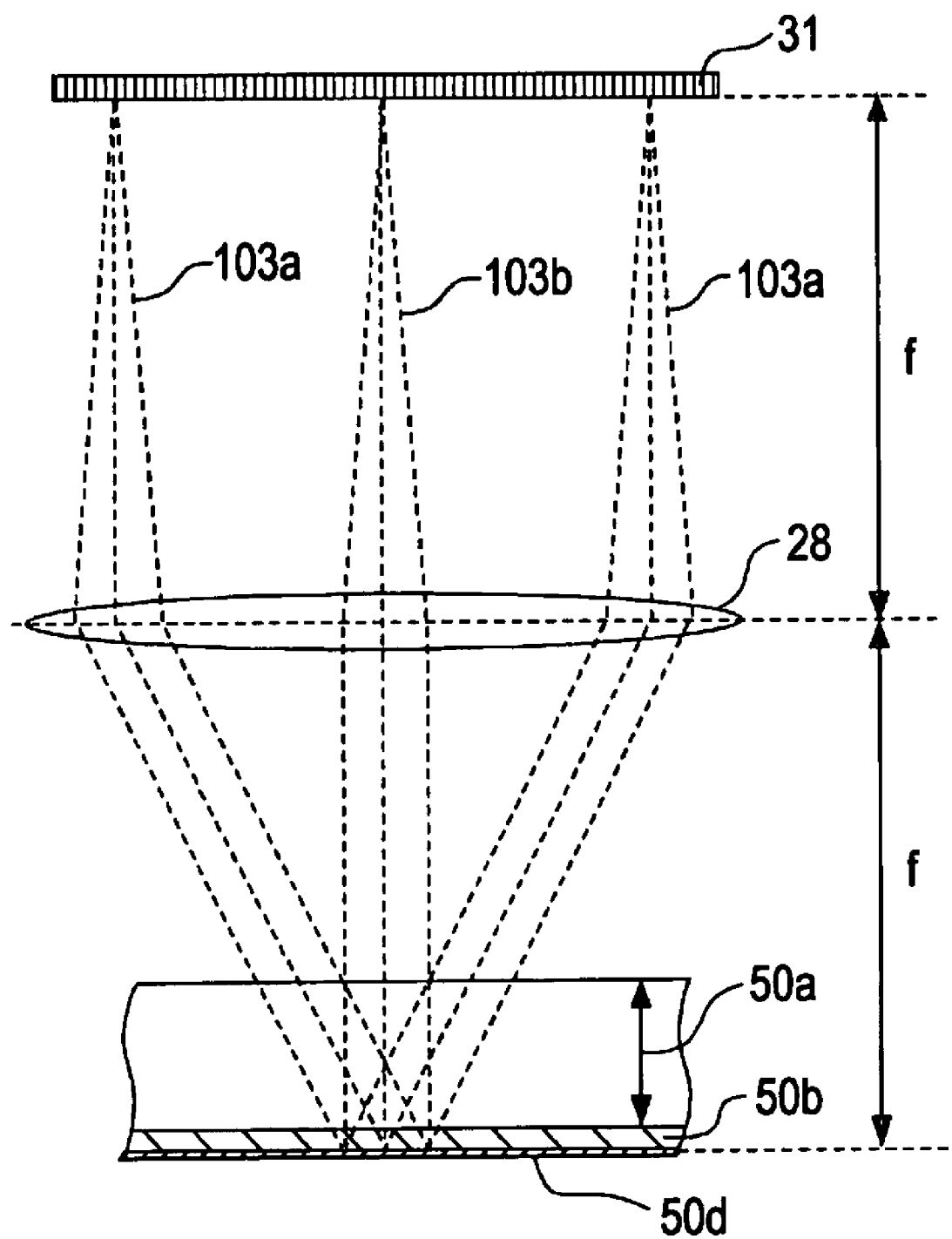
FIG. 3 is a view schematically showing a signal beam and a reference beam.

For example, as shown in FIG. 2, a hollow ring-shaped reference-beam spatial light modulating section 31a, and a circular signal-beam spatial light modulating section 31b are coaxially formed in the outer and inner peripheral portions of the spatial light modulator 23, respectively. As schematically shown in FIG. 3, the light beams reflected by these reflecting regions pass through the Fourier transform lens 24, the iris 25, the Fourier transform lens 26, the ¼ wavelength plate 27, and the objective lens 28 as a signal beam 103b and a reference beam 103a having the same centerline and arranged coaxially, with this centerline coinciding with the optical axis of the optical parts. That is, the signal beam and the reference beam are made incident on a standard hologram recording medium 50 used for recording and reproduction by way of a common optical path.

Herein, the standard hologram recording medium 50 refers to a readable and writable medium that does not function as a ROM, unlike a duplicate hologram recording medium produced by using a production apparatus or production method according to an embodiment of the present invention that will be described later. The hologram recording medium 50 has a holding substrate 50c, a recording layer 50a, a holding substrate 50b, a reflective layer 50d, and a protective layer 50e. Each of the holding substrate 50c and holding substrate 50b is formed of a material such as glass or polycarbonate transmitting a light beam. The recording layer 50a is formed of, for example, a photopolymer. The reflective layer 50d is formed of, for example, aluminum, and the protective layer 50e is formed of, for example, resin. It should be noted that the duplicate hologram recording medium that will be described later has read/write compatibility with the hologram recording medium 50 described above.

As shown in FIG. 3, interference between the signal beam 103b and the reference beam 103a occurs mainly in an area near the Fourier region (Fraunhofer region), and the recording layer 50a formed of a photopolymer or the like is arranged in this region. Monomers in the recording layer 50a change to a polymer in accordance with the mode of this interference, causing a change in refractive index in a small region, and recording data is recorded as a diffraction grating (hologram) corresponding to the resulting refractive index pattern. Here, the Fourier transform lens 24 is used for creating a Fourier-image forming surface, the iris 25 is used for blocking excess light by the Fourier-image forming surface, the Fourier transform lens 26 is used for creating a real-image forming surface once again, the ¼ wavelength plate 27 is used for converting linearly polarized light into circularly polarized light, and the objective lens 28 is used for condensing the signal beam and the reference beam to a predetermined region of the recording layer 50a.

Next, referring to FIG. 1 again, description will be given of the optical section 10 as the main portion of a coaxial-type hologram reproduction apparatus. In addition to the laser light source 20, the polarization beam splitter 22, the spatial light modulator 23, the Fourier transform lens 24, the iris 25, the Fourier transform lens 26, the ½ wavelength plate 27, and the objective lens 28 described above, the coaxial-type hologram reproduction apparatus includes an image sensor 29 such as a CCD (Charge Coupled Device) or a COS.

At the time of reproduction, only a reference beam pattern is displayed on the reference-beam spatial light modulating section of the spatial light modulator 23, and an all-black pattern (pattern that blocks the reflection of a light beam) is displayed on the signal-beam spatial light modulating section 31b (see FIG. 2). Then, as in the case of recording, the light beam from the laser light source 20 is reflected by the polarization beam splitter 22, and is reflected again by the spatial light modulator 23. Then, as described above, the light beam reflected after being subjected to light modulation only by the reference-beam spatial light modulating section 31a (see FIG. 2) passes through the Fourier transform lens 24, the iris 25, the Fourier transform lens 26, the ½ wavelength plate 27, and the objective lens 28, and made incident on the recording layer 50a of the hologram recording medium 50.

At this time, a reconstruction beam (diffracted beam) corresponding to the hologram formed in the recording layer 50a due to this reference beam is generated and reflected by the reflective layer 50d. This reconstruction beam passes through the respective optical parts in the order of the objective lens 28, the ¼ wavelength plate 27, the Fourier transform lens 26, the iris 25, and the Fourier transform lens 24, and changes to linearly polarized light by having its polarization direction changed by π/2 by the ¼ wavelength plate 27. The reconstruction beam whose light-beam traveling direction has been changed by the action of the polarization beam splitter 22 is radiated to the image sensor 29. An electrical signal obtained from the image sensor 29 is a signal corresponding to the shape of a hologram, that is, recording data. Thus, in a control section (not shown), recording data can be reproduced from this electrical signal.

Here, in a coaxial-type hologram recording and reproduction apparatus (apparatus capable of performing both recording and reproduction), the optical system is constructed as including all the above-mentioned optical parts relating to the recording operation and all the above-mentioned optical parts relating to the reproducing operation. Further, a coaxial-type hologram recording apparatus includes only the above-mentioned optical parts relating to the recording operation, and a coaxial-type hologram reproduction apparatus includes only the above-mentioned optical parts relating to the reproducing operation.

(With Regard to an Apparatus and Method for Producing a Duplication Master for Duplicating a Hologram Recording Medium, and a Duplication Master)

Figure 8A:
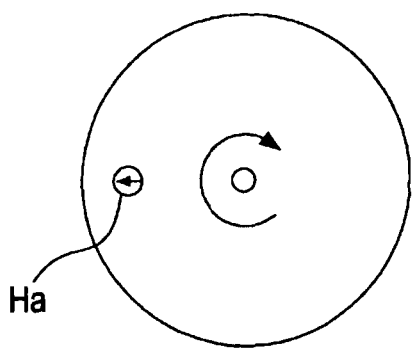
FIGS. 8A to 8D are views showing the relationship between holograms recorded at different rotation-angle positions of a duplication master and master-producing reference beams.
Figure 8B:
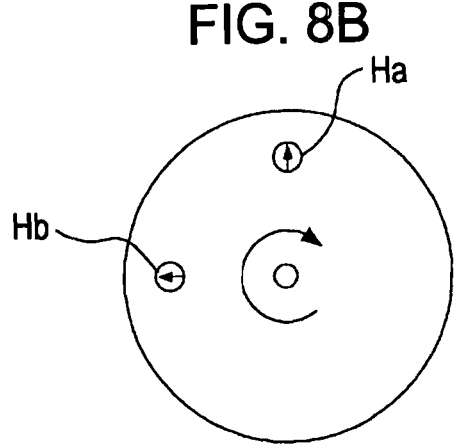
Figure 8C:
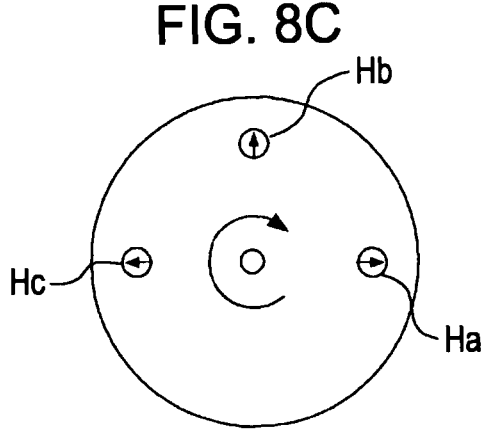
Figure 8D:
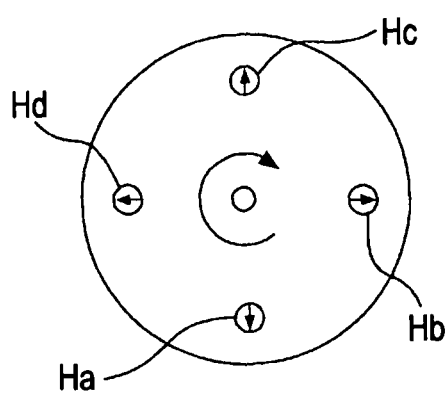
Figure 9:
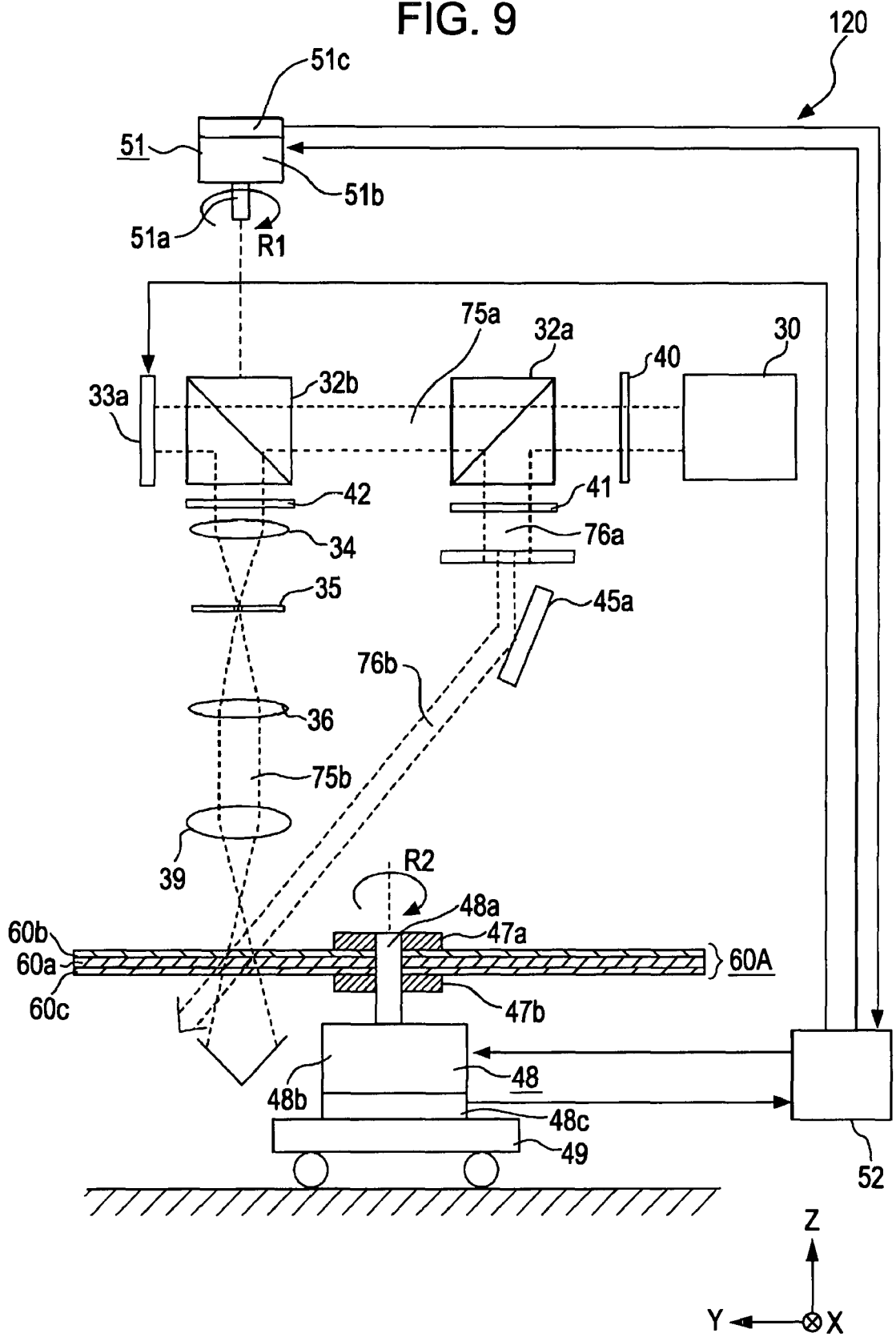
FIG. 9 is a conceptual view of an optical section as the main portion of an apparatus for producing a duplication master.
Figure 10A:
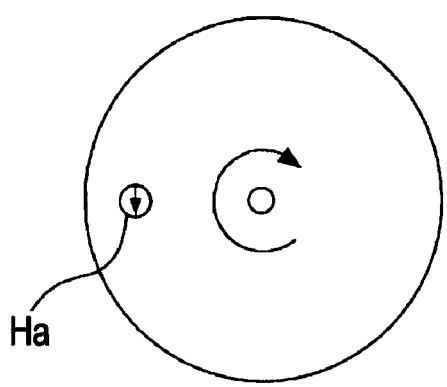
FIGS. 10A to 10D are views showing the relationship between holograms recorded at different rotation-angle positions of a duplication master and master-producing reference beams.
Figure 10B:
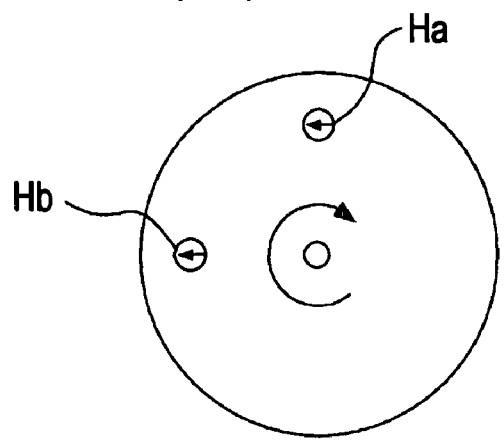
Figure 10C:
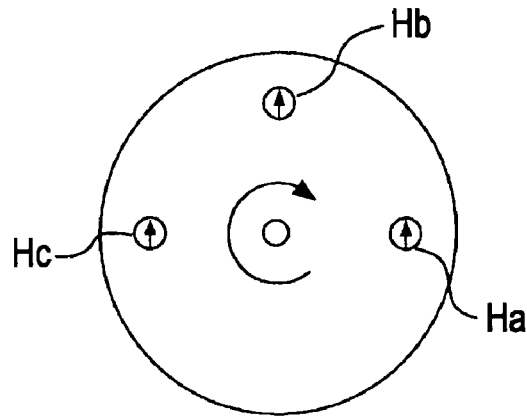
Figure 10D:
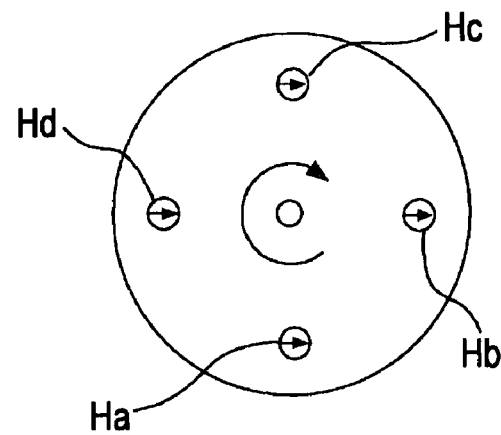
Figure 11:
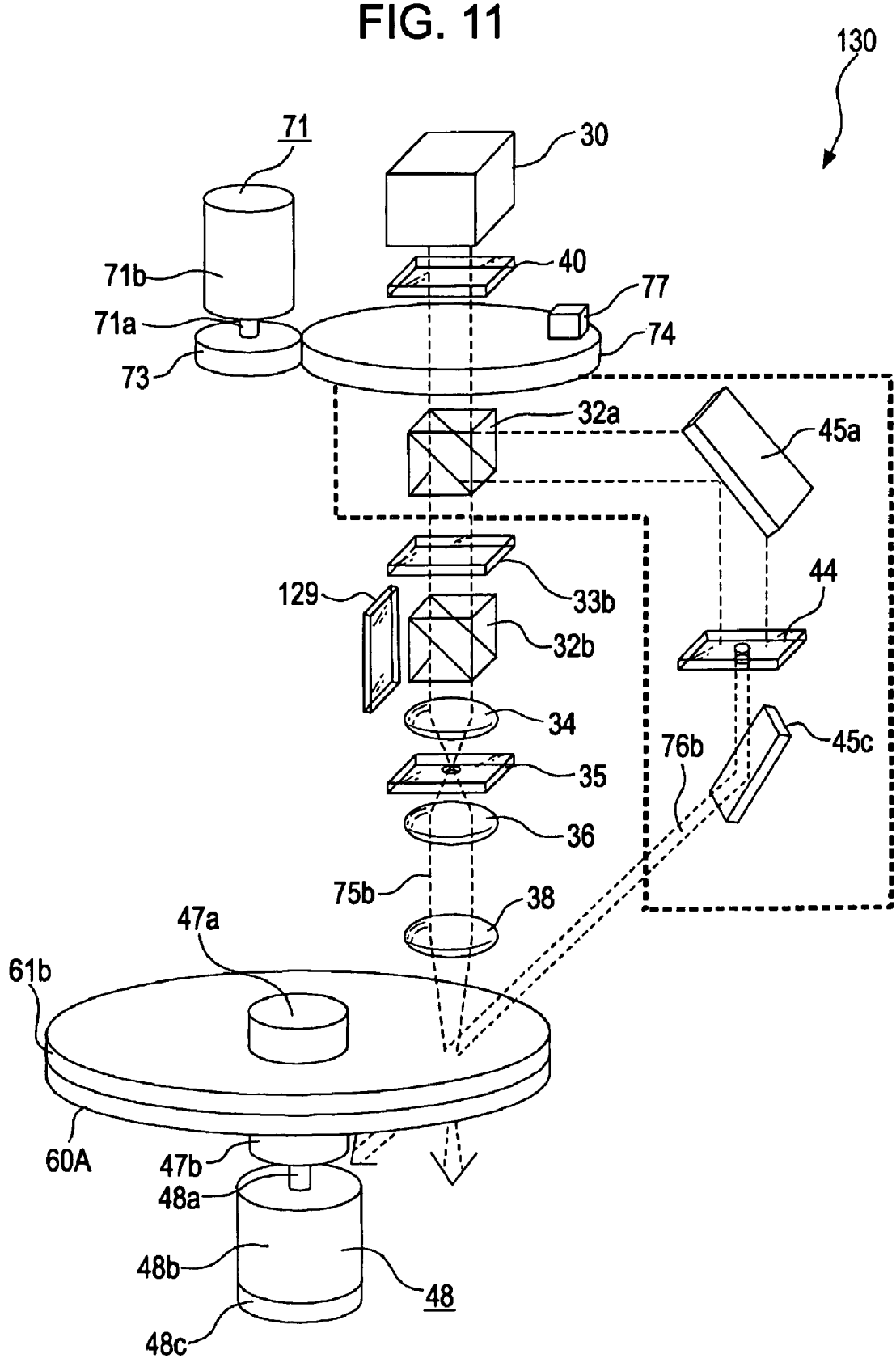
FIG. 11 is a conceptual view of an optical section as the main portion of an apparatus for producing a duplication master.

Referring to FIGS. 4, 5, 6, 9, and 11, description will be given of the main portion of an apparatus for producing a master (hereinafter, abbreviated as duplication-master production apparatus), which is used for producing a master for producing a duplicate hologram recording medium (hereinafter, abbreviated as duplication master) that enables reproduction of recording data by the hologram reproduction apparatus having the optical section 10 shown in FIG. 1, or enables additional writing (recording) and reproduction in a case where the duplicate hologram recording medium has an area permitting additional writing. Further, the operation of the duplication-master production apparatus will be described with reference to FIGS. 7, 8A to 8D, and 10A to 10D. FIGS. 4 to 8D are views illustrating a technique for producing a duplication master according to a first embodiment of the present invention, and FIGS. 9 to 11 are views illustrating a technique for producing a duplication master according to a second embodiment of the present invention. In the following description, an unrecorded duplication master prior to formation of holograms, or a duplication master having holograms partially formed thereon but not formed in all of the planned regions (predetermined regions), is denoted as a duplication master 60A, the duplication master according to the first embodiment is denoted as a duplicate mater 60B, and the duplication master according to the second embodiment is denoted as a duplicate mater 60C.

(With Regard to a Duplication Master According to a First Embodiment and a Production Technique for the Duplication Master)

Figure 4:
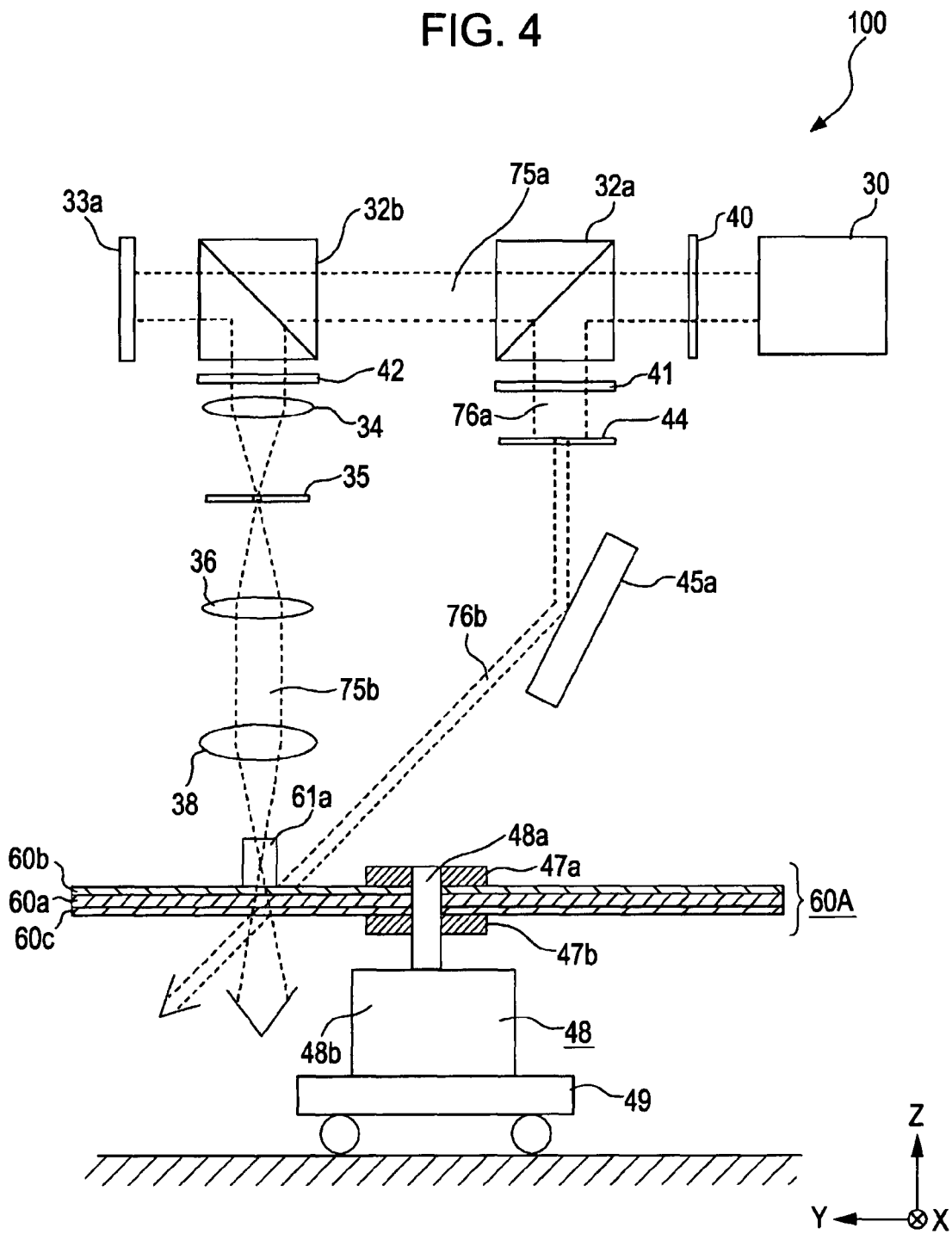
FIG. 4 is a conceptual view of an optical section as the main portion of an apparatus for producing a duplication master.
Figure 5:
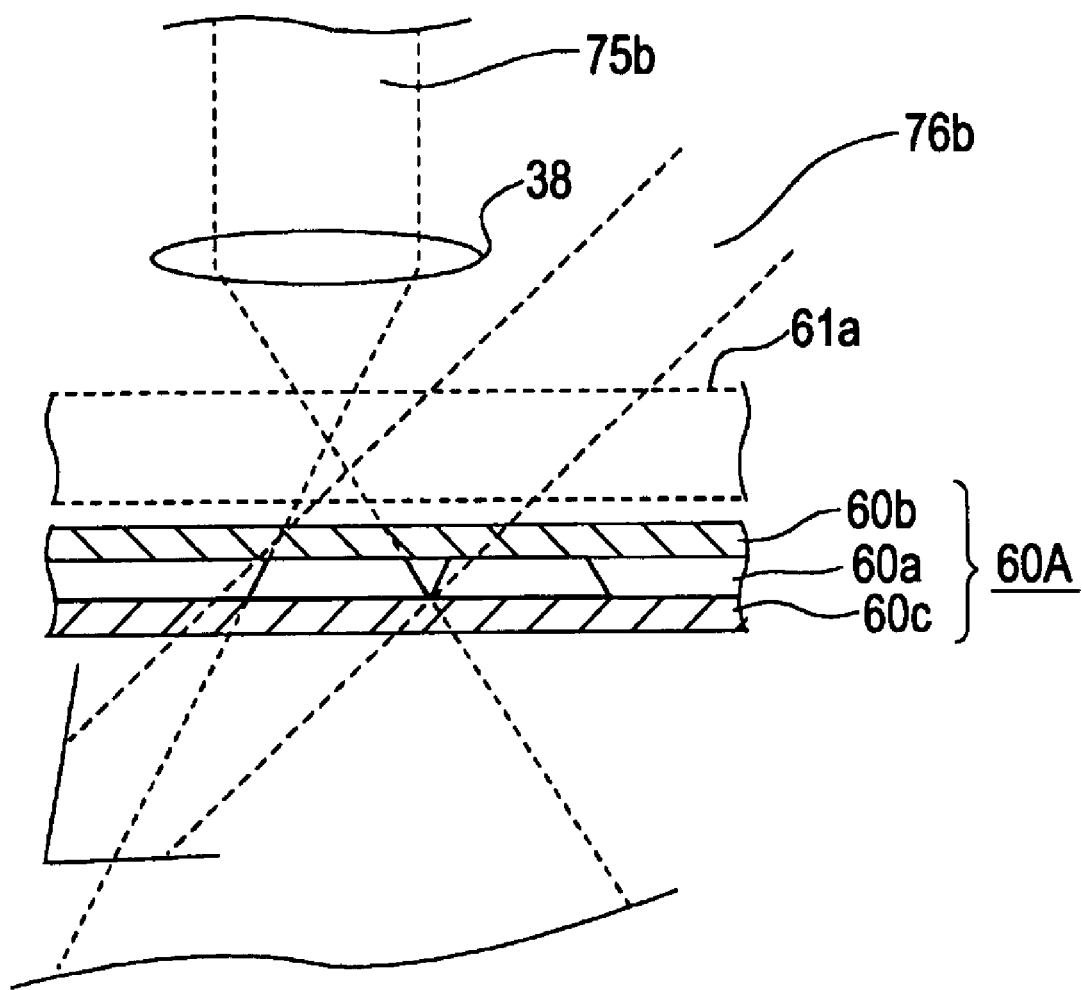
FIG. 5 is a partial enlarged view of FIG. 4.

FIG. 4 shows an optical section 100 as the main portion of an apparatus for producing a duplication master that is a master used for the duplication of a duplicate hologram recording medium, which enables reproduction of recording data by the hologram reproduction apparatus having the optical section 10 shown in FIG. 1. FIG. 5 is a partial enlarged view of the optical section 100 shown in FIG. 4. In the following, the technique for producing the duplication master according to the first embodiment will be described with reference to FIGS. 4 and 5.

The optical section 100 constituting the main portion of the apparatus for producing a duplication master shown in FIG. 4 includes, as its main optical parts, a laser light source 30, a half-wave plate 40, a polarization beam splitter 32a, a polarization beam splitter 32b, a spatial light modulator 33a formed of liquid crystal or the like, a Fourier transform lens 34, an iris 35, a Fourier transform lens 36, an objective lens 38, a dummy glass 61a, an aperture 44, and a mirror 45a. Further, the apparatus for producing a duplication master includes, as its mechanism parts, a spindle motor 48 and a movable carriage 49 for moving the duplication master 60A relative to the optical section 100. The spindle motor 48 rotates the duplication master 60A about a spindle-motor rotating shaft 48a as the rotation canter axis, with the duplication master 60A crimped between a fitting member 47a and a fitting member 47b. The movable carriage 49 is secured to a spindle-motor fixing section 48b, and adapted to move the duplication master 60A in the lateral direction (Y-axis direction) in the plane of FIG. 4 by a moving force from a drive mechanism (not shown). It should be noted that in the following description, it is assumed that the X axis, the Y axis, and Z axis are orthogonal to each other, with the leftward direction in the plane of the drawing taken as the positive direction of the Y axis, the upward direction in the plane of the drawing taken as the positive direction of the Z axis, and the direction from the front side to the back side of the plane of the drawing taken as the positive direction of the X axis.

The single-mode laser of the laser light source 30 is, for example, an external resonator type laser such as a Littrow type or Littman type one, and emits a single-mode light beam. Then, the light beam sequentially passes through the following optical parts (none of which are shown) included in the laser light source 30. The beam profile of the light beam undergoes shaping as the light beam passes through an anamorphic prism, the light beam intensity is measured as the light beam passes through a power monitor, return light to the single-mode laser is blocked as the light beam passes through an isolator, a control as to whether or not the light beam is to pass through subsequent optical parts is performed as the light beam passes through a shutter on the basis of whether the shutter is ON or OFF, and an aberration is corrected as the light beam passes through a spatial filter. The resulting light beam thus has good wavelength characteristics.

Then, the light beam emitted from the laser light source 30 has its polarization plane rotated by the half-wave plate 40, and is split by the polarization beam splitter 32a into a master-producing reference beam 76a and a coaxial beam 75a. In this case, the rotation of the half-wave plate 40 is adjusted to thereby adjust the light quantity ratio between a modulated coaxial beam 75b and a master-producing reference beam 76b so that the light quantity ratio becomes 1:1, and the position of the half-wave plate 40 is fixed after this adjustment. The light beam has its beam diameter adjusted by the aperture 44 so as to make the size of the master-producing reference beam 76b in the duplication master 60A appropriate, and also so as to use only the light beam of uniform intensity near the center portion of the master-producing reference beam 76a whose light beam intensity has a Gaussian distribution. Then, the master-producing reference beam 76a is made incident from the duplication master 60A. It should be noted that in the above description, the terms "upward" and "upper side" refer to the positive direction of the Z axis, and the terms "downward" and "lower side" refer to the negative direction of the Z axis.

On the other hand, the coaxial beam 75a, which is a light beam prior to undergoing spatial light modulation, is transmitted through the polarization beam splitter 32a, becomes different in phase by $\pi/2$ from that of the master-producing reference beam 76a reflected by the polarization beam splitter 32a, and is transmitted through the polarization beam splitter 32b to be radiated to the spatial light modulator 33a. Then, a light beam as the modulated coaxial beam 75b that has undergone modulation in accordance with a pattern displayed in the spatial light modulator 33a is reflected off the spatial light modulator 33a. The modulated coaxial beam 75b has its polarization plane changed by $\pi/2$ upon reflection by the spatial light modulator 33a, and is then reflected by the polarization beam splitter 32b to be guided toward the optical path described below. In this way, the polarization directions of both the modulator coaxial beam 75b and the master-producing reference beam 76b are made to coincide with each other as S polarized light waves.

In this regard, the spatial light modulator 33a has two light-beam reflecting regions including a signal-beam spatial light modulating section that displays a signal beam pattern based on recording data, and a reference-beam spatial light modulating section that displays a reference beam pattern. In the same manner as in FIG. 2, for example, a hollow ring-shaped reference-beam spatial light modulating section, and a circular signal-beam spatial light modulating section are coaxially formed in the outer and inner peripheral portions of the spatial light modulator 33a, respectively. The light beams reflected by these reflecting regions each pass through the Fourier transform lens 34, the iris 35, the Fourier transform lens 36, the objective lens 38, and further the dummy glass 61a used for correcting an aberration, as the modulated coaxial beam 75b including a signal beam and a reference beam that have the same centerline and are arranged coaxially, with this centerline coinciding with the optical axis of the respective optical parts described below through which the modulated coaxial beam 75b passes. That is, the signal beam and the reference beam included in the modulated coaxial beam 75b are made incident on the duplication master 60A by way of a common optical path formed by the above-mentioned various optical parts.

Then, the modulated coaxial beam 75b, and the master-producing reference beam 76b emitted from the laser light source 30 as the same light source from which the modulated coaxial beam 75b is emitted, come into interference with each other in a recording layer 60a (see FIG. 5) of the duplication master 60A which is formed of a photopolymer. Then, monomers in the recording layer 60a change into a polymer in accordance with the mode of this interference, causing a change in refractive index in a small region of the recording layer 60a, and a diffraction grating (hologram) corresponding to the resulting refractive index pattern is formed. Here, the Fourier transform lens 34 is used for creating a Fourier-image forming surface, the iris 35 is used for blocking excess light by the Fourier-image forming surface, the Fourier transform lens 36 is used for creating a real-image forming surface once again, the objective lens 38 is used for condensing the signal beam and the reference beam to a predetermined region of the recording layer 60a, and the dummy glass 61a is used for correcting in advance for an aberration caused by a duplicate hologram recording medium that will be described later and by an angle selective plate (see FIG. 12) that will be described later at the time of production of a duplication master, thus ensuring that a hologram can be accurately duplicated onto the duplicate hologram recording medium produced by using this duplication master. In this embodiment, the objective lens 38 and the dummy glass 61a each function as an embodiment of a condenser section.

Further, in FIG. 4, there is adopted a structure in which the master-producing reference beam 76b is introduced from the inner peripheral side (side close to the spindle-motor rotating shaft 48a) of the duplication master 60A, and is allowed to exit from the outer peripheral side (side far from the spindle-motor rotating shaft 48a) of the duplication master 60A. However, it is also possible to adopt a structure in which the master-producing reference beam 76b is introduced from the outer peripheral side of the duplication master 60A, and is allowed to exit from the inner peripheral side of the duplication master 60A.

Referring to the partial enlarged view of FIG. 5, the process of forming a hologram on the duplication master 60A by the modulated coaxial beam 75b and the master-producing reference beam 76b will be described in more detail. In FIG. 5, portions that are the same as those shown in FIG. 4 are denoted by the same symbols, and description of the portions denoted by the same symbols is omitted.

Figure 12:
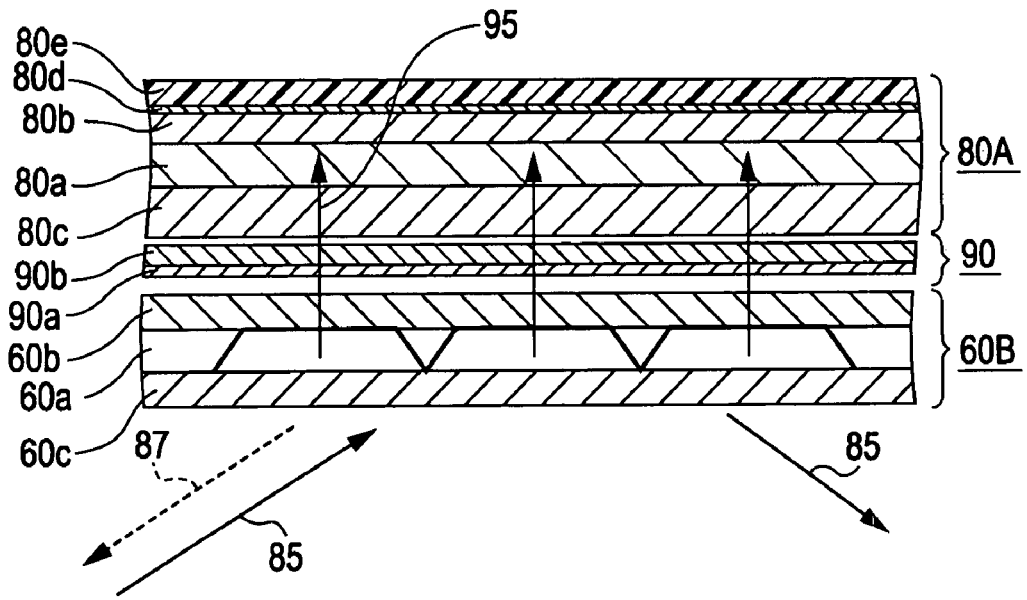
FIG. 12 is a view illustrating the principle of a technique for producing a duplicate hologram recording medium using a duplication master.

The magnitude of an aberration produced by the dummy glass 61a due to the modulated coaxial beam 75b is so selected as to allow formation of an accurate hologram on the recording layer of a duplicate hologram recording medium, by previously compensating for the influence of aberrations due to a duplicate hologram recording medium (for example, a duplicate hologram recording medium 80A shown in FIG. 12) and an angle selective plate (for example, an angle selective plate 90) on the duplicating reference beam (for example, a duplicating reference beam 85 shown in FIG. 12) used in the duplication of a hologram. The dummy glass 61a is made to have an appropriate aberration as described above by adjusting, for example, the thickness and refractive index of its glass material. In this regard, if the magnitude of aberrations produced by the duplicate hologram recording medium and the angle selective plate is small, the duplication master 60B having good duplicating property can be produced without providing the dummy glass 61a. Further, instead of the objective lens 38 and the dummy glass 61a, an objective lens having equivalent aberration characteristics may also be used. In this case, such an aberration-corrected objective lens (for example, an objective lens 39 shown in FIG. 9) functions as an embodiment of the condenser section. When such a condenser section is included, the dummy glass 61a shown in FIG. 4 becomes unnecessary, thereby making the configuration of the optical section extremely simple.

In this regard, the duplication master 60A has the recording layer 60a formed of a photopolymer or the like, and a holding substrate 60b and a holding substrate 60c that are formed of glass, polycarbonate, or the like. The recording layer 60a is sandwiched from both sides by the holding substrate 60b and the holding substrate 60c. The material for each of the holding substrate 60b and the holding substrate 60c is not limited to glass or polycarbonate as far as it can hold the recording layer 60a and exhibits a property of transmitting the modulated coaxial beam 75b and the master-producing reference beam 76b.

Further, the modulated coaxial beam 75b and the master-producing reference beam 76b come into interference with each other inside the recording layer 60a, forming a hologram. This hologram is recorded as a change in refractive index. Then, after the formation of the hologram, the modulated coaxial beam 75b and the master-producing reference beam 76b exit to the outside from the surface (the lower surface shown in FIGS. 4 and 5) of the holding substrate 60c of the duplication master 60A.

In the manner as described above, a hologram are formed on the recording layer 60a of the duplication master 60A on which no hologram has been previously recorded. At this time, after the hologram is formed in a predetermined region of the recording layer 60a of the duplication master 60A, the duplication master 60A is rotated by the spindle motor 48, and a hologram is formed in another region of the recording layer 60a. Further, when holograms are to be formed in a concentric fashion, after a hologram is formed over one rotation of the duplication master 60A, a hologram is formed in the region of an adjacent track by moving the movable carriage 49, which is used for moving the entire spindle motor 48, in the Y-axis direction. In this way, it is possible to produce a duplication master 60B having holograms formed in all the regions of the recording layer 60a. Further, when holograms are to be formed in a spiral fashion, the duplication master 60B can be produced by moving the movable carriage 49 in the Y-axis direction while rotating the duplication master 60A. That is, holograms are formed while moving the positions of the dummy glass 61a, which is secured to a reference base as a part of the optical section 100 together with other optical parts, and of the duplication master 60A that moves together with the spindle-motor rotating shaft 48a and the movable carriage 49, relative to each other.

More specifically, a control section (not shown) performs the control of the spindle motor 48, a movable-carriage actuator (not shown) performs the control of moving the movable carriage 49, and an objective-lens actuator (not shown) performs the control of moving the objective lens 38 in the Z-axis direction. At this time, the spindle motor 48 and the movable carriage 49 are controlled in synchronization with each other, and holograms are sequentially formed in a concentric or spiral fashion as described above. On the other hand, the objective lens 38 is controlled by the action of a feedback loop in such a way that the modulated coaxial beam 75b is condensed to a predetermined position of the recording layer 60a.

For example, the feedback control for controlling the objective lens 38 acts as follows. The above-described feedback loop is formed by adopting an astigmatic method in which a minute amount of return light reflected from the interface between the recording layer 60a and the holding substrate 60c is detected, this return light is condensed by a condenser lens (not shown) and a lenticular lens (not shown), and a focus signal is obtained from the subtraction of signals generated in the diagonal direction of a quadrant photodetector (not shown). Such a control technique is commonly used in the production of a master of a CD-ROM or DVD-ROM described in the related art. In this embodiment, the spindle motor 48, the movable carriage 49, the movable carriage actuator, and the control section function as an embodiment of a hologram-forming-position moving section.

In this embodiment, when holograms to be recorded into the recording layer 60a of the duplication master 60A overlap each other, a crosstalk may occur at the time of reproduction from a duplicate hologram recording medium produced from the duplication master 60B produced in this way, resulting in deterioration of the S/N (signal to noise ratio) of a reproduction signal. In such a case, the S/N of the reproduction signal from the duplicate hologram recording medium can be improved by changing the angle of the mirror 45a to vary the incidence angle of the master-producing reference beam 76b on the recording layer 60a in advance.

Figure 6:
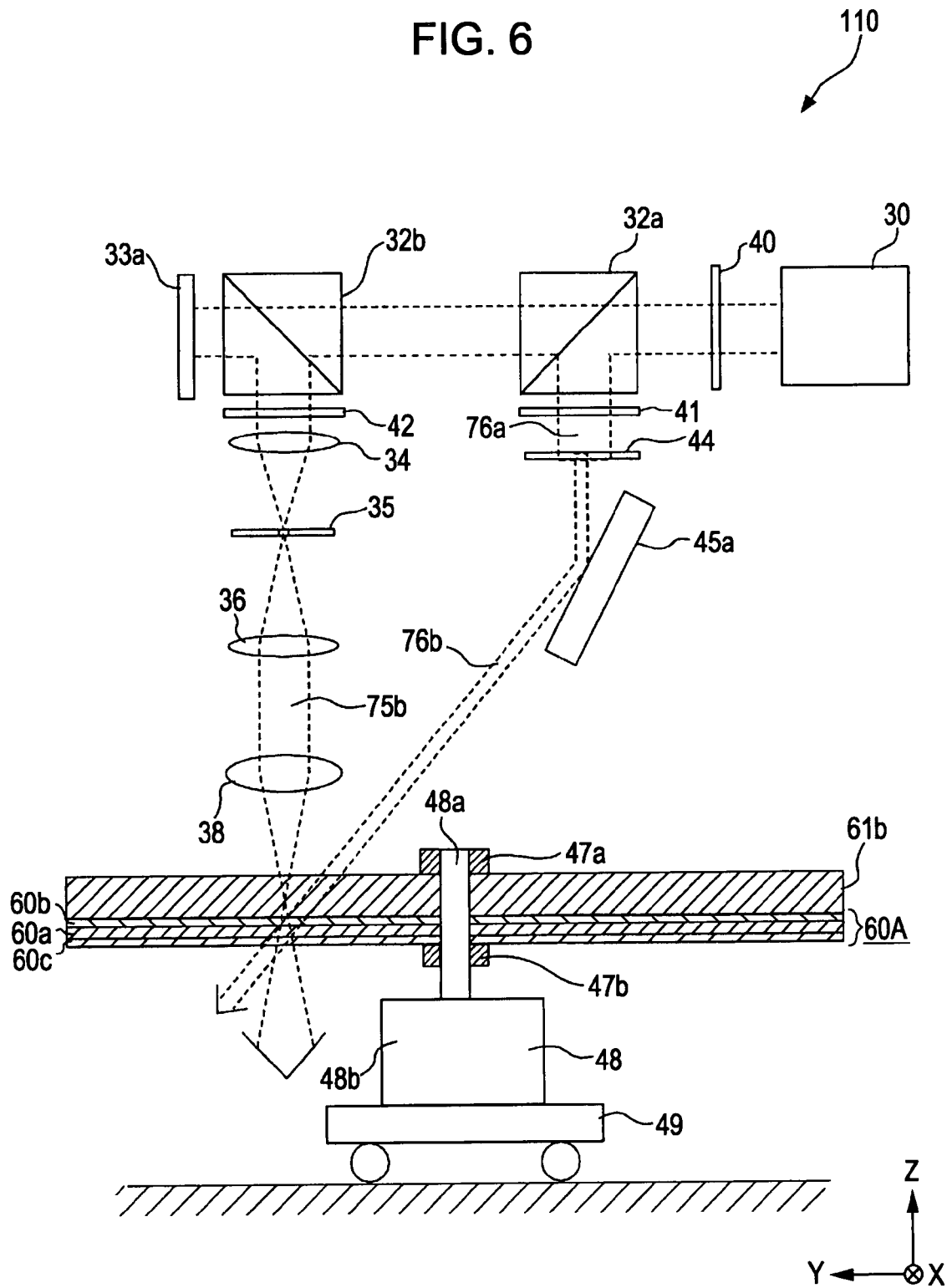
FIG. 6 is a conceptual view of an optical section as the main portion of an apparatus for producing a duplication master.

FIG. 6 shows an optical section 110 as the main portion of another embodiment of an apparatus for producing a duplication master. The difference between the optical section 110 and the optical section 100 resides in the use of a dummy glass 61b instead of the dummy glass 61a. Components having the same configuration and providing the same effects as those of the optical section 100 are denoted by the same symbols and description thereof is omitted.

In this case, the characteristic feature of the dummy glass 61b resides in that the dummy glass 61b is secured with respect to the duplication master 60A by the fitting member 47a and the fitting member 47b, and the dummy glass 61b moves with respect to the master-producing reference beam 76b and the modulated coaxial beam 75b together with the duplication master 60A. The dummy glass 61b is formed in a disc-like shape and arranged in close proximity to the duplication master 60A.

When the above-mentioned configuration is adopted, although the size of the dummy glass 61b becomes large in comparison to that of the optical part 100, there is no need to move the dummy glass 61b together with the modulated coaxial beam 75b, thus simplifying the configuration of the optical section.

Further, in FIG. 6, there is adopted a structure in which the master-producing reference beam 76b is introduced from the inner peripheral side (side close to the spindle-motor rotating shaft 48a), and is allowed to exit from the outer peripheral side (side far from the spindle-motor rotating shaft 48a). However, it is also possible to adopt a structure in which the master-producing reference beam 76b is introduced from the outer peripheral side of a prism and is allowed to exit toward the inner peripheral side of the prism, by changing the arranging position of the mirror 45a from that shown in FIG. 6.

Referring to FIGS. 7 and 8A to 8D, the configurations of a hologram formed on the duplication master 60B by the production apparatus having the optical section shown in FIGS. 4 and 6 will be described.

Figure 7:
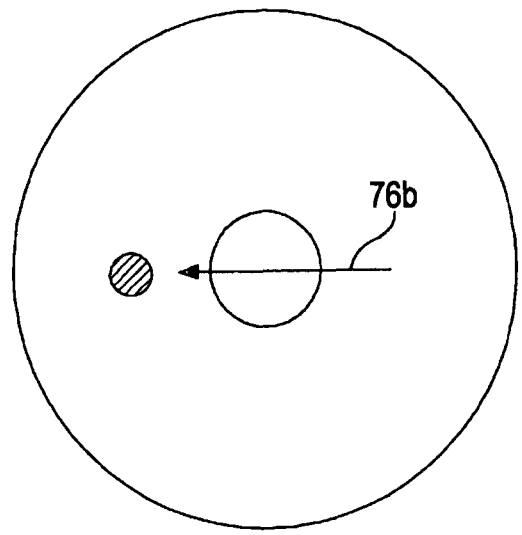
FIG. 7 is a view showing the relationship between hologram-forming regions and a master-producing reference beam as seen from the side of the front surface of a duplication master.

FIG. 7 shows the relationship between a hologram-forming region (the small circle with oblique lines in FIG. 7) and the master-producing reference beam 76b (indicated by an arrow in FIG. 7) as seen from the side of the front surface (in FIGS. 4 and 6, the surface parallel to the XY plane that is a plane including the X axis and the Y axis) of the duplication master 60B.

FIGS. 8A to 8D show the relationship between holograms recorded at different rotation-angle positions of the duplication master 60A and the master-producing reference beam 76b. In the production apparatus having the optical section 100 shown in FIG. 4 or the optical section 110 shown in FIG. 6, when forming a plurality of hologram-forming regions in units of pages, the duplication master 60A is rotated by the spindle motor 48, which means that equivalent rotation of the master-producing reference beam 76b takes place in accordance with this rotation. That is, FIG. 8A shows the incidence direction of the master-producing reference beam 76b immediately after formation of a hologram Ha as indicated by an arrow. Further, FIG. 8B shows the equivalent incidence angle of the master-producing reference beam 76b subsequent to the formation of the hologram Ha as indicated by an arrow, and further shows the incidence angle of the master-producing reference beam 76b immediately after formation of a hologram Hb as indicated by an arrow, after rotating the duplication master 60A by 90° in the rotation direction indicated by an arrow. FIG. 8C shows the equivalent incidence angle of the master-producing reference beam 76b subsequent to the formation of the hologram Ha as indicated by an arrow, shows the equivalent incidence angle of the master-producing reference beam 76b subsequent to the formation of the hologram Hb as indicated by an arrow, and further shows the incidence angle of the master-producing reference beam 76b immediately after formation of a hologram Hc as indicated by an arrow, after rotating the duplication master 60A by 180° in the rotation direction indicated by an arrow. FIG. 8D shows the equivalent incidence angle of the master-producing reference beam 76b subsequent to the formation of the hologram Ha as indicated by an arrow, shows the equivalent incidence angle of the master-producing reference beam 76b subsequent to the formation of the hologram Hb as indicated by an arrow, shows the equivalent incidence angle of the master-producing reference beam 76b subsequent to the formation of the hologram Hc as indicated by an arrow, and further shows the incidence angle of the master-producing reference beam 76b immediately after formation of a hologram Hd as indicated by an arrow, after rotating the duplication master 60A by 270° in the rotation direction indicated by an arrow.

Although not shown in FIGS. 8A to 8D, the incidence direction of the master-producing reference beam 76b with respect to a hologram after rotating the duplication master 60A by 360° in the rotation direction indicated by an arrow becomes the same as that with respect to the hologram Ha. That is, in the holograms formed on straight lines extending radially from the rotation center, all the equivalent incidence directions of the master-producing reference beam 76b are the same. In the following, the duplication master 60B on which all the holograms are formed such that the equivalent incidence directions of the master-producing reference beam 76b are arranged in correspondence to radial lines extending from the rotation axis of the duplication master 60A, will be referred to as the duplication master according to the first embodiment. The equivalent incidence direction of the master-producing reference beam 76b, which is a crucial concept in the context of the production of a duplicate hologram recording medium, will be described later.

(With Regard to a Duplication Master According to a Second Embodiment and a Production Technique for the Duplication Master)

FIG. 9 shows an optical section 120 as the main portion of a production apparatus for producing a duplication master according to a second embodiment. The use of the optical section 120 enables production of a duplication master of a configuration different from that of the above-described duplication master according to the first embodiment. Hereinbelow, referring to FIGS. 9 and 10, description will be given of a duplication master 60C as the duplication master according to the second embodiment, and of the production technique for the duplication master 60C. Components having the same configuration and providing the same effects as those of the optical section 100 and optical section 110 are denoted by the same symbols and description thereof is omitted.

The differences of the optical section 120 shown in FIG. 9 from the optical section 100 and the optical section 110 reside in that an optical-section rotating motor 51 having a rotation angle detector 51c is added as a mechanism part constituting the optical section 120, the spindle motor 48 has a rotation angle detector 48c, and that an aberration-corrected objective lens 39 is used instead of the combination of the objective lens 38 and the dummy glass 61a. Here, an optical-section-rotating-motor fixing section 51b of the optical-section rotating motor 51 is secured to a reference base. Further, optical parts are secured to an optical-section-rotating-motor rotating shaft 51a so that the entire optical section is rotated about the optical axis of the optical parts through which the modulated coaxial beam 75b passes. That is, the laser light source 30, the half-wave plate 40, the polarization beam splitter 32a, the polarization beam splitter 32b, the spatial light modulator 33a, the Fourier transform lens 34, the iris 35, the Fourier transform lens 36, the objective lens 39, the aperture 44, and the mirror 45a are integrally rotated by the optical-section rotating motor 51 about the optical axis of the optical parts which is the centerline of the modulated coaxial beam 75b (in FIG. 9, the rotation direction is denoted by symbol R1).

Referring to FIGS. 10A to 10D, description will be given of the configurations of a hologram formed on the duplication master 60C, which is a duplication master produced by the production apparatus having the optical section 120 shown in FIG. 9.

FIGS. 10A to 10D show the relationship between hologram-forming regions and the master-producing reference beam 76b as seen from the side of the front surface (corresponding to the surface parallel to the XY plane in FIG. 9) of the duplication master 60A. In the production apparatus having the optical section shown in FIG. 9, when forming a plurality of hologram-forming regions in units of pages, the duplication master 60A is rotated (the rotation direction is denoted by symbol R2 in FIG. 9) by the spindle motor 48, and the optical-section-rotating-motor rotating shaft 51a of the optical-section rotating motor 51 is rotated (the rotation direction is denoted by symbol R1 in FIG. 9), thereby rotating the entire optical section 120. That is, in synchronization with one rotation of the duplication master 60A by the spindle motor 48, the entire optical section 120 is rotated one revolution by the optical-section rotating motor 51.

Due to the synchronized rotations of the duplication master 60A and optical section 120, the incidence direction of the master-producing reference beam 76b changes as shown in FIGS. 10A to 10D, forming holograms, which equivalently means that the master-producing reference beam 76b is made incident on the duplication master 60A from one direction in accordance with this rotation. That is, FIG. 10A shows the incidence direction of the master-producing reference beam 76b immediately after formation of a hologram Ha as indicated by an arrow. Further, FIG. 10B shows the equivalent incidence angle of the master-producing reference beam 76b subsequent to the formation of the hologram Ha as indicated by an arrow, and further shows the incidence angle of the master-producing reference beam 76b immediately after formation of a hologram Hb as indicated by an arrow, after rotating the duplication master 60A by 90° in the rotation direction indicated by an arrow. FIG. 10C shows the equivalent incidence angle of the master-producing reference beam 76b subsequent to the formation of the hologram Ha as indicated by an arrow, shows the equivalent incidence angle of the master-producing reference beam 76b subsequent to the formation of the hologram Hb as indicated by an arrow, and further shows the incidence angle of the master-producing reference beam 76b immediately after formation of a hologram Hc as indicated by an arrow, after rotating the duplication master 60A by 180° in the rotation direction indicated by an arrow. FIG. 10D shows the equivalent incidence angle of the master-producing reference beam 76b subsequent to the formation of the hologram Ha as indicated by an arrow, shows the equivalent incidence angle of the master-producing reference beam 76b subsequent to the formation of the hologram Hb as indicated by an arrow, shows the equivalent incidence angle of the master-producing reference beam 76b subsequent to the formation of the hologram Hc as indicated by an arrow, and further shows the incidence angle of the master-producing reference beam 76b immediately after formation of a hologram Hd as indicated by an arrow, after rotating the duplication master 60A by 270° in the rotation direction indicated by an arrow.

Although not shown in FIGS. 10A to 10D, the incidence direction of the master-producing reference beam 76b with respect to a hologram after rotating the duplication master 60A by 360° in the rotation direction indicated by an arrow becomes the same as that with respect to the hologram Ha. That is, all the equivalent incidence directions of the master-producing reference beam 76b are the same. In the following, the duplication master 60C in which the equivalent incidence directions of the master-producing reference beam 76b are oriented in the same direction will be referred to as the duplication master according to the second embodiment.

A control section 52 shown in FIG. 9 performs the control of rotating the optical-section-rotating-motor rotating shaft 51a of the optical-section rotating motor 51 in synchronization with one rotation of the duplication master 60A by the spindle motor 48, thereby rotating the entire optical section 120 one revolution. The control section 52 has a CPU (Central Processing Unit), a RAM (Random Access Memory), a ROM (Read Only Memory), a D/A converter, an A/D converter, and a power amplifier (none of which is shown).

The control by the control section 52 is performed as follows. The optical-section-rotating-motor rotating shaft 51a of the optical-section rotating motor 51 is rotated so that the angle detected by the rotation angle detector 48c of the spindle motor 48 and the angle detected by the rotation angle detector 48c of the optical-section rotating motor 51 become equal or have a given angular difference. This maintains the synchronization between the rotation of the duplication master 60A and the entire optical section 120. After a hologram is formed in a predetermined region of the recording layer 60a of the duplication master 60A while performing such synchronizing operation, the duplication master 60A is rotated by the spindle motor 48, and a hologram is formed in another predetermined region of the recording layer again. When tracks are to be formed in a concentric fashion, after a hologram is formed over one rotation of the duplication master 60A, the movable carriage 49, which causes the entire spindle motor 48 to move, is moved in the Y-axis direction. When tracks are to be formed in a spiral fashion, the movable carriage 49 is moved in the Y-axis direction together with the rotation of the spindle-motor rotating shaft 48a. Accordingly, holograms are recorded into all the planned recording regions of the duplication master 60A, thereby producing the duplication master 60C as the duplication master according to the second embodiment.

In this regard, since the entire optical section 120 is rotated, the modulated coaxial beam 75b also rotates, so the shape of a hologram also rotates in accordance with the rotation of the duplication master 60A. Further, the shape of a hologram to be formed on a duplicate hologram recording medium also rotates due to such rotation. On the other hand, the shape of a hologram recorded by a common hologram recording and reproduction apparatus using the optical section 10 as shown in FIG. 1 does not rotate in this way. Therefore, the problem of so-called read compatibility arises between a duplicate hologram recording medium produced from the duplication master 60C produced by the optical section 120, and a hologram recording medium that has undergone recording by using the optical section 10 shown in FIG. 1.

In order to overcome the above-mentioned problem of read compatibility and eliminate the influence of the rotation of a hologram formed in a hologram recording medium, a configuration may be adopted in which when reproducing a signal corresponding to recording data from a duplicate hologram recording medium by a hologram recording and reproduction apparatus having the optical section 10 shown in FIG. 1, an electrical signal equivalent to a signal obtained by processing a reconstructed image due to a reconstruction beam generated in the image sensor 29, which is formed by a collection of fine photodetectors fragmented in a two-dimensional grid-like array, by a reproducing circuit (not shown in FIG. 1) and by returning the rotation thereof, is obtained, thus reproducing a signal corresponding to an image that is to be generated in the image sensor 29 if no rotation takes place, and then reproduction processing is performed.

(With Regard to a Duplication Master According to a Third Embodiment and a Production Technique for the Duplication Master)

In the case where read compatibility is secured through the processing of rotating the reconstructed image due to the reconstruction beam generated in the image sensor 29 by the reproducing circuit, the burden placed on the processing of the hologram recording and reproduction apparatus is large. To secure the read compatibility between a duplicate hologram recording medium and a hologram recording medium that has undergone recording by the recording and reproduction apparatus having the optical section 10 shown in FIG. 1, it is most desirable to make the recording formats used at the time of recording the same. In the following, such a duplication master in which the equivalent incidence directions of the master-producing reference beam 76*b* are oriented in the same direction while having completely the same recording format as that of the hologram recording medium that has undergone recording by the recording and reproduction apparatus having the optical section 10, will be referred to as a duplication master 60D according to a third embodiment, and the technique for producing the duplication master 60D will be described.

The duplication master 60D can be produced by using the optical section 120 shown in FIG. 9. In this case, the control section 52 controls the spatial light modulator 33*a* as follows.

In accordance with the angle detected by the rotation angle detector 48*c* of the spindle motor 48, the control section 52 causes both the patterns of a signal-beam spatial light modulating section that displays a signal beam pattern based on recording data displayed on the spatial light modulator 33*a*, and of a reference-beam spatial light modulating section that displays a reference beam pattern, to rotate about the optical axis. That is, during the period of time in which the spindle motor 48 makes one rotation, the signal beam pattern displayed on the signal-beam spatial light modulating section and the reference beam pattern displayed on the reference-beam spatial light modulating section each make one rotation about the optical axis. This processing is performed through digital computation processed by the CPU in the control section 52. The problem of read compatibility between duplicate hologram recording media is thus overcome.

FIG. 11 shows an optical section 130 as the main portion of still another production apparatus for producing the duplication master 60D. In FIG. 11, components having the same configuration and providing the same effects as those of the optical section 100, optical section 110, and optical section 120 are denoted by the same symbols, and description thereof is omitted. The differences between the optical section 130 shown in FIG. 11 and the optical section 120 shown in FIG. 9 are as follows. In the optical section 120, the entire optical section 120 rotates in synchronization with the rotation of the spindle-motor rotating shaft 48*a* of the spindle motor 48. On the other hand, in the optical section 130, optical parts for generating the modulated coaxial beam 75*b* and radiating it to the duplication master 60A are fixed to a reference base. Further, the optical parts (the optical parts within the area bounded by thick lines in FIG. 11) for generating the modulated coaxial beam 75*b* and radiating it to the duplication master 60A are configured to rotate in synchronization with the rotation of the spindle-motor rotating shaft 48*a* of the spindle motor 48. In the following, the optical section 130 will be described with reference to FIG. 11.

In the optical section 130, the optical parts fixed to the reference base (hereinafter, referred to as the stationary-portion optical parts) are the laser light source 30, the half-wave plate 40, the transmission-type spatial light modulator 33*b* formed of liquid crystal or the like, the polarization beam splitter 32*b*, an image sensor 129, the Fourier transform lens 34, the iris 35, the Fourier transform lens 36, and the objective lens 38. Further, mechanism parts fixed to the reference base are a fixing portion 71*b* of a movable-optical-portion rotating motor 71 for rotating the movable portion of an optical part, and a spindle-motor fixing portion 48*b* of the spindle motor 48. These stationary-portion optical parts are secured integrally to each other. In this regard, the reason for providing the polarization beam splitter 32*b* and the image sensor 129 is to adjust the optical section 130 by the output of the image sensor 129.

In the optical section 130, the optical parts that rotate about the optical axis of the modulated coaxial beam 75*b* (hereinafter, referred to as the movable-portion optical parts) are the polarization beam splitter 32*a*, a mirror 45*b*, the aperture 44, and a mirror 45*c*. These movable-portion optical parts are secured integrally to each other, and can be smoothly rotated about the optical axis of the stationary-potion optical parts, that is, about the optical axis of the modulated coaxial beam 75*b* by using a rotating/holding mechanism having a bearing (not shown). Further, disc-shaped pulleys 73 and 74, and the movable-optical-portion rotating motor 71 are used as the above-mentioned rotating mechanism for rotating the movable-portion optical parts. A rotation shaft 71*a* of the movable-optical-portion rotating motor 71 is secured to the center of rotation of the pulley 73, and the pulley 74 and the movable-portion optical parts are secured in position so that the center of rotation of the pulley 74 and the optical axis of the stationary-potion optical parts coincide with each other. A movable-portion-rotation detector 77 that detects the rotation angle of the movable-portion optical parts is arranged on the stationary side where the stationary-portion optical parts are arranged. The movable-portion-rotation detector 77 emits a light beam and detects reflection light from a radial barcode indicating a rotation angle which is affixed to the surface of the pulley 74, thereby detecting the rotation angle of the pulley 74, that is, the rotation angle of the movable-portion optical parts.

When the optical section 130 shown in FIG. 11 is adopted, the number of the movable-portion optical parts can be reduced as compared with the case where the optical section 120 shown in FIG. 9 is adopted. Further, since the modulated coaxial beam 75*b* guided through the optical path formed by the stationary-portion optical parts does not undergo rotation, it is unnecessary to perform the processing of rotating the signal beam pattern and the reference beam pattern in accordance with the rotation of the spindle motor 48 to obtain the duplication master 60D, as is the case with the optical section 120 shown in FIG. 9. Further, the dummy glass 61*b* can be made unnecessary when the above-described aberration-corrected objective lens 39 is used instead of the objective lens 38 shown in FIG. 11.

In the optical section 130, a control section (not shown) acts as follows to achieve the synchronization between the rotations of the spindle motor 48 and movable-optical-portion rotating motor 71. The control section drives the spindle motor 48. The duplication master 60A and the dummy glass 61b are held in press contact with each other by the fitting member 47a and the fitting member 47b so that the duplication master 60A and the dummy glass 61b rotate together with the spindle-motor rotating shaft 48a. Then, a signal from the rotation angle detector 48c of the spindle motor 48 is taken in. Then, the control section compares this angle detected by the rotation angle detector 48c and the angle detected by the movable-portion-rotation detector 77 with each other, and controls the movable-optical-portion rotating motor 71 in such a way that these angles coincide with each other or the angular difference between these angles becomes a given value. Since such control processing is sequentially performed, the angle between the stationary-portion optical parts and the movable-portion optical parts, and the rotation angle of the spindle-motor rotating shaft 48a can be synchronized with each other. In this way, it is possible to produce the hologram duplication master 60D with holograms recorded in such a way that the equivalent incidence directions of the master-producing reference beam 76b are oriented in the same direction, and in which the modulated coaxial beams 75b are formed so as to be radially arranged in an equivalent fashion.

(With Regard to Post Processing)

Each of the hologram duplication master 60B according to the first embodiment, the hologram duplication master 60C according to the second embodiment, and the hologram duplication master 60D according to the third embodiment, on which holograms are recorded in a planned area of the recording layer as described above, is used as a duplication master. At this time, if there is a region in the recording layer 60a of each of these duplication masters where no hologram has been recorded, due to the action of a light beam radiated during the production of a duplicate hologram recording medium that will be described later, holograms may be further formed on the hologram duplication master 60B, the hologram duplication master 60C, and the hologram duplication master 60D. The occurrence of such a situation means that there is a difference in recorded content on the duplicate hologram recording medium in the initial state at the start of production, and the duplicate hologram recording medium in a state after some time has elapsed since the start of production, which is not preferable for a duplication master.

In view of the above, it is desirable to perform post processing by radiating light of poor coherence to the hologram duplication masters 60B to 60D having holograms recorded in a planned area of the recording layer 60a. The post processing refers to the processing of changing all the monomers that have remained in the hologram duplication masters 60B to 60D into polymers. Any light can be used as the light to be radiated as long as it has a wavelength to which media have sensitivity and is poor in coherence. For example, scattered light may be radiated to the hologram duplication masters 60B to 60D at once.

(With Regard to the Principle of the Technique for Producing a Duplicate Hologram Recording Medium Using a Duplication Master)

FIG. 12 is a view illustrating the principle of the technique for producing a duplicate hologram recording medium using a duplication master as will be described below. Here, a duplicating reference beam 85 is a light beam of various forms, such as a circular light beam (spot-shaped light beam), a light beam having a large width in one direction (one-dimensional band-shaped light beam), a broad light beam (two-dimensional enlarged light beam) enlarged to a large area (for example, an area that covers the whole of the duplication master 60C or duplication master 60D), and is a light beam that enters from the left in FIG. 12 and exits to the right in FIG. 12. Here, it is assumed that the duplicating reference beam 85 has a wavelength substantially equal to the wavelength of the master-producing reference beam 76b. Further, the duplicating reference beam 85 is radiated to a hologram formed in the recording layer 60a of the duplication master 60B, generating a diffracted beam 95.

The process of producing a duplicate hologram recording medium will be described in more detail below. Here, as the duplication master, one of the above-mentioned duplication masters 60B to 60D is used to produce a duplicate hologram recording medium. In this regard, when describing a principle common to all of the duplication masters, the term "duplication masters 60B to 60D" is used, and when describing about one of the duplication masters, an explicit indication to that effect will be given.

When the above-mentioned principle is used, since there is no need to provide an imaging optical system formed by a large-aperture objective lens such as the one described in the related art, the production equipment can be simplified. Further, since the imaging characteristics do not become a problem, the thickness of the recording layer 60a of the duplication master 60B, and the thickness of a recording layer 80a of the duplicating recording medium 80A can be freely selected. If the thickness of the recording layer 60a is increased, it is possible to enhance the diffraction efficiency in the production of a duplicate hologram recording medium, and if the thickness of the recording layer 80a is increased, it is possible to enhance the diffraction efficiency when reproducing a signal from the duplicate hologram recording medium. In either case, ultimately, it is possible to enhance the quality of a reproduction signal from the duplicate hologram recording medium.

The duplicate hologram recording medium 80A will be described. The duplicate hologram recording medium 80A is a member having the recording layer 80a, a holding substrate 80b, a holding substrate 80c, a reflective layer 80d, and a protective layer 80e. The duplicate hologram recording medium 80A represents a duplicate hologram recording medium on which no hologram has been recorded or which is prior to the completion of the duplication process. In the following description, a duplicate hologram recording medium that has completed the duplication process is denoted as a duplicate hologram recording medium 80B, and an explicit indication to the effect that the duplicate hologram recording medium being described is a duplicate hologram recording medium that has completed the duplication process will be given as needed.

The duplicate hologram recording medium 80B has read compatibility with a recording and reproduction apparatus having the optical section 10 shown in FIG. 1, and has read and write compatibility in the case where the duplicate hologram recording medium 80B is an additionally-writable medium. Accordingly, for example, the recording layer 80a is formed of a photopolymer, the holding substrate 80b and the holding substrate 80c are formed of glass or polycarbonate, the reflective layer 80d is formed of aluminum, and the protective layer 80e is formed of resin.

Figure 13:
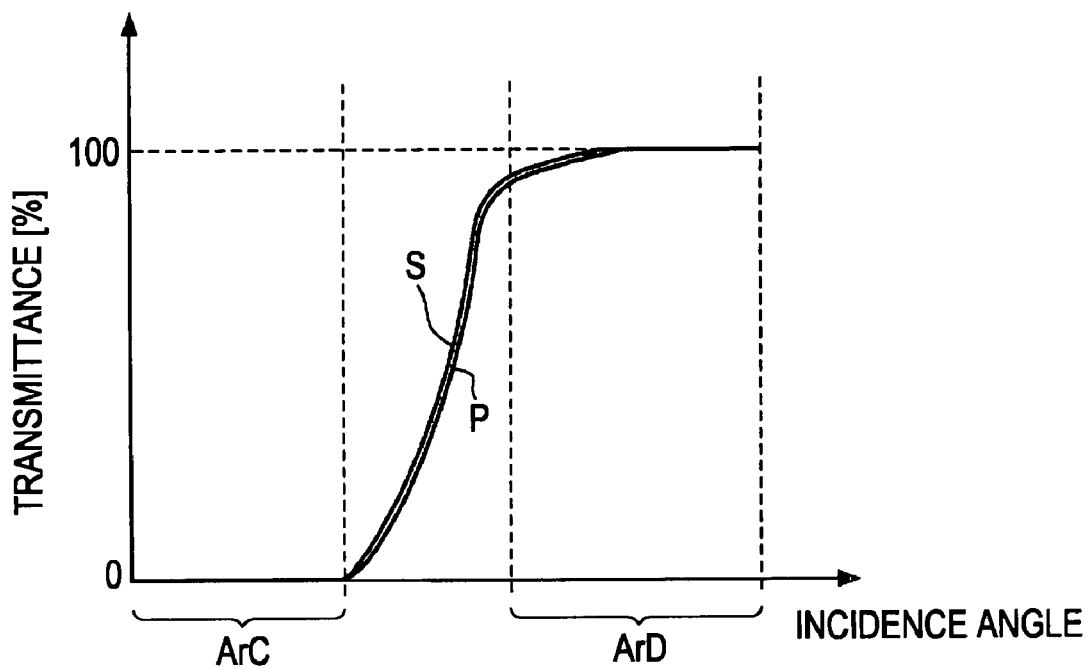
FIG. 13 is a diagram showing the characteristics of an angle selective film.

The angle selective plate 90 will be described. The angle selective plate 90 is a member having an angle selective film 90a and a holding substrate 90b, and constitutes an essential feature of the present technique. The angle selective film 90a is a film whose transmittance has angle selectivity, and an example of its characteristics is shown in FIG. 13. The vertical axis in FIG. 13 indicates transmittance, and the horizontal axis in FIG. 13 indicates incidence angle of a light beam. Two curves are drawn in FIG. 13 to respectively indicate a P-polarized light beam (hereinafter, referred to as the P-polarized light wave) and an S-polarized light beam (hereinafter, referred to as the S-polarized light wave). The method of forming the angle selective film 90a as shown in FIG. 13 is a technique widely known in the field of the production of optical parts. There are no particular limitations on the material of the holding substrate 90b as long as it transmits the diffracted beam 95. For example, glass or polycarbonate is used.

Since, as shown in FIG. 12, the incidence angle of the duplicating reference beam 85 with respect to the angle selective film 90a is set as substantially equal to the incidence angle of the master-producing reference beam 76b, the incidence angle is small, and falls within the range of a duplicating-reference-beam angle region ArC shown in FIG. 13. On the other hand, the incidence angle of the diffracted beam 95 generated by the duplicating reference beam 85, which has been made incident at an incidence angle that falls within the range of the duplicating-reference-beam angle region ArC, is large as shown in FIG. 12 (for example, with the optical section 10 shown in FIG. 1 taken as an example, the incidence angle falls within the range of the aperture of the objective lens 28), and falls within the range of a diffracted-beam angle region ArD shown in FIG. 13.

Due to the action of the angle selective film 90a as described above, the master-producing reference beam 76b is reflected by the angle selective film 90a and hence does not reach the duplicate hologram recording medium 80A, whereas the diffracted beam 95 from the duplication masters 60B to 60D is transmitted through the angle selective film 90a to be radiated to the duplicate hologram recording medium 80A. While the master-producing reference beam 76b reflected by the angle selective film 90a passes through the duplication masters 60B to 60D again, since the Bragg's condition for reproduction is not satisfied in this case, no diffracted beam is generated. In the case where holograms are recorded by performing angle multiplexing or rotation multiplexing in the duplicating maters 60B to 60D, by varying the duplicating reference beam 85 in accordance with the incidence angle of the master-producing reference beam 76b at the time of production of the duplication masters 60B to 60D, the diffracted beam 95 corresponding to each of a plurality of holograms that have been recorded in a multiplexed fashion is generated, thereby making it possible to produce the duplicate hologram recording medium 80B obtained by duplicating the plurality of multiplexed holograms onto the duplicate hologram recording medium 80A. In this case, the incidence angle of the master-producing reference beam 76b must be within the range of the duplicating-reference-beam angle region ArC.

Here, angle multiplexing refers to a technique in which, when forming holograms on the duplication master 60A to produce the duplication masters 60B to 60D, the incidence angle of the master-producing reference beam 76b on the duplication master 60A (in FIG. 9, the incidence angle on the surface parallel to the plane including the Y axis and the X axis) is varied to thereby form a plurality of holograms in overlapping regions of the recording layer 60a. Rotation multiplexing refers to a technique in which, when forming holograms on the duplication master 60A to produce the duplication masters 60B to 60D, the incidence angle of the master-producing reference beam 76b on the duplication master 60A (in FIG. 9, the incidence angle on the surface parallel to the plane including the X axis and the Y axis) is varied to thereby form a plurality of holograms in overlapping regions of the recording layer 60a. The techniques of angle multiplexing and rotation multiplexing themselves are known in the art.

Further, light radiated to the duplicate hologram recording medium 80A from the duplication masters 60B to 60D forms a hologram in the recording layer 80a due to the action of the diffracted beam 95. In this regard, since the reflective layer 80d is arranged in the duplicate hologram recording medium 80A, the diffracted beam 95 from the duplication masters 60B to 60D is reflected by the reflective layer 80d to return to the duplication masters 60B to 60D again. A diffracted beam 87 (second diffracted beam) is generated as the diffracted beam 95 (first diffracted beam) is radiated to the duplication masters 60B to 60D. Since the diffracted beam 87 is directed opposite to the side of the duplicate hologram recording medium 80A as shown in FIG. 12, the diffracted beam 87 does not exert an influence on hologram duplication.

By applying the above-described technical principle, specific embodiments of an apparatus for producing a duplicate hologram recording medium and a method for producing a duplicate hologram recording medium will be described below as first to third embodiments. The duplication master 60B can be used for a production technique for producing a duplicate hologram recording medium according to a first embodiment and a production technique for producing a duplicate hologram recording medium according to a second embodiment, and either the duplication master 60C or the duplication master 60D can be used for a production technique for producing a duplicate hologram recording medium according to a third embodiment.

(With Regard to the Production Technique According to the First Embodiment for Producing a Duplicate Hologram Recording Medium from the Duplication Master 60B)

As the technique for producing a duplicating hologram recording medium using the duplication master 60B, the production apparatus according to the first embodiment, and the production method according to the first embodiment which uses this production apparatus will be described. According to the production apparatus and the production method, duplication is performed by positioning the angle selective plate 90 so as to be sandwiched between the duplication master 60B and the duplicate hologram recording medium 80A, radiating a light spot to the radiating master 60B, and scanning this light spot in the two-dimensional direction. A duplicate-hologram-recording-medium production apparatus 140 according to the first embodiment will be described with reference to FIG. 14. As described above, in the duplication master 60B, holograms are formed by radiating the master-producing reference beam 76b radially with reference to the center of the duplication master 60B (which coincides with the center of rotation of a spindle-motor rotating shaft 98a shown in FIG. 14) as shown in FIGS. 8A to 8D. Since this direction does not depend on the radial position of the duplication master 60B and is the same at any position in the inner and outer peripheries, by taking this point into consideration, the duplicate hologram recording medium 80B onto which information of the duplication master 60B has been duplicated is produced by the duplicate-hologram-recording-medium production apparatus 140 according to the first embodiment.

The duplicate-hologram-recording-medium production apparatus 140 according to the first embodiment has a laser light source 88, a spindle motor 98, and the duplication master 60B as its main components. The laser light source 88 emits a duplicating reference beam 85a. The duplicating reference beam 85a has a wavelength that is substantially equal to the wavelength of the master-producing reference beam 76b emitted from the laser light source 30 used in the production of the duplication master 60B. The laser light source 88 is placed on a movable carriage, and is driven by an actuator (not shown) so as to move in the direction (positive direction of the Y axis) indicated by an arrow in FIG. 14. The spindle motor 98 has a fitting member 97a and a fitting member 97b that rotate together with the spindle-motor rotating shaft 98a. The fitting member 97a and the fitting member 97b allow the duplicate hologram recording medium 80A, the angle selective plate 90, and the duplication master 60B to be laminated on top of one another and rotated by the rotating force of the spindle motor 98. In this embodiment, the fitting member 97a and the fitting member 97b serve as an embodiment of a positioning section. While in this example the laser light source 88 is placed on a movable carriage to move the position of a light spot radiated to the duplication master 60B, the light spot and the duplication master 60B may be moved in their relative positions by moving the duplication master 60B placed on a movable carriage.

Figure 14:
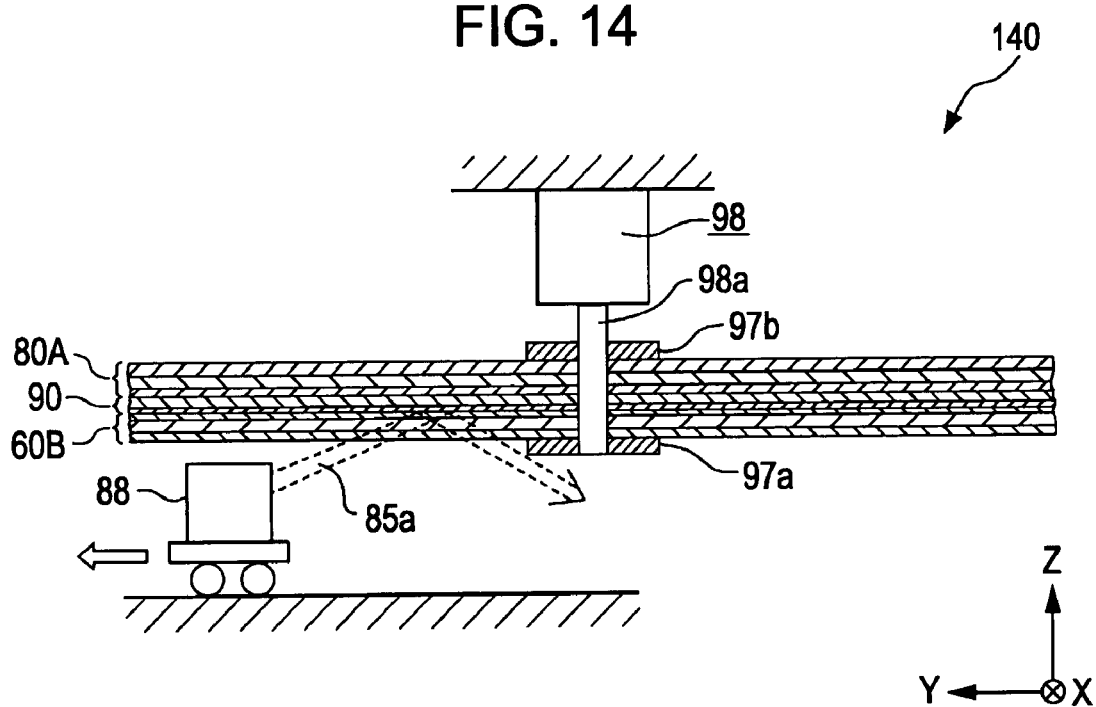
FIG. 14 is a conceptual view of a duplicate-hologram recording-medium production apparatus.
Figure 15:
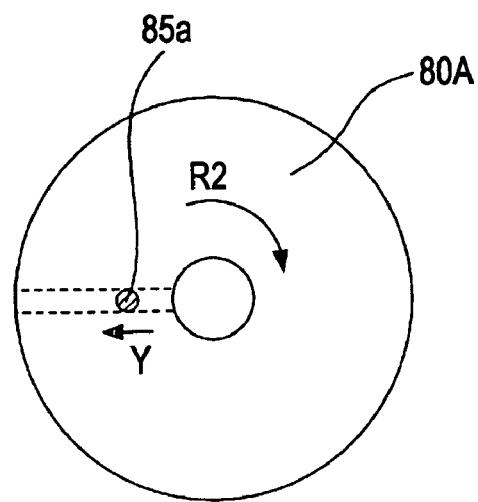
FIG. 15 is a perspective view of a duplicate hologram recording medium as seen from above, illustrating a duplicating reference beam formed as a light spot.

FIG. 15 is a perspective view of the duplicate hologram recording medium 80A as seen from above, illustrating the movement of the duplicating reference beam 85a formed as a light spot. In this case, when producing the duplication master 60B according to the first embodiment, the duplicating reference beam 85a is made incident at the same incidence angle as that of the master-producing reference beam 76b used as shown in FIGS. 8A to 8D. That is, holograms are sequentially formed by moving and radiating the duplicating reference beam 85a radially with reference to the center of the duplication master 60B (which is the center of rotation of the spindle-motor rotating shaft 98a in FIG. 14), finally producing the duplicate hologram recording medium 80B.

Here, the traveling direction of the duplicating reference beam 85a will be described. According to the configuration as shown in FIG. 4, a hologram is formed in the following manner on the duplication master 60B produced by using the optical section 100 shown in FIG. 4. That is, the modulated coaxial beam 75b is temporarily condensed, and a hologram is formed in the recording layer 60a of the duplication master 60A arranged in rear of the condensing point. Accordingly, the hologram formed on the duplication master 60B as a result of the production process has a specific shape corresponding to the position of the condensing point. That is, as shown in FIG. 5, the shape of the hologram is such that it is large on the side of the holding substrate 60c and is small on the side of the holding substrate 60b. On the other hand, when taking the positional relationship between the duplicate hologram recording medium 80A, the angle selective plate 90, and the duplication master 60B into configuration, as shown in FIG. 12, it is necessary to make the incidence angle of the duplicating reference beam 85a opposite (phase conjugation) to the incidence angle of the duplicating reference beam 85a in FIG. 4.

More specifically, duplication is performed according to the following procedure. The rotation of the spindle-motor rotating shaft 98a for rotating both the duplication master 60B and the duplicate hologram recording medium 80A is stopped. The duplicating reference beam 85a, which has a substantially circular shape in the cross section taken perpendicular to the light-beam traveling direction, moves from the inner periphery toward the outer periphery of the duplication master 60B in accordance with the movement of the laser light source 88. The spindle-motor rotating shaft 98a stops again after rotating the duplication master 60B and the duplicate hologram recording medium 80A (the direction of rotation is indicated by an arrow denoted by symbol R2 in FIG. 15). The rotation angle at this time is set such that the distance of movement around the outermost periphery of the duplication master 60B is not larger than the length of the radius of the cross section of the duplicating reference beam 85a. Then, the duplicating reference beam 85a again moves from the inner periphery toward the outer periphery of the supplication master 60B in accordance with the movement of the laser light source 88. The above-mentioned procedure is repeated to thereby finally obtain the duplicate hologram recording medium 80B onto which holograms of all the planned duplication regions of the duplication master 60B have been duplicated.

According to another procedure, the spindle-motor rotating shaft 98a for rotating the duplication master 60B and the duplicate hologram recording medium 80A together is continuously rotated, and after the duplicating reference beam 85a is radiated for the duration of one revolution (360°), the rotation of the spindle-motor rotating shaft 98a is stopped. The laser light source 88 is moved in the direction from the inner periphery toward the outer periphery of the duplication master 60B by a distance not larger than the length of the radius of the cross section of the duplicating reference beam 85a. Then, the spindle-motor rotating shaft 98a for rotating the duplication master 60B and the duplicate hologram recording medium 80A together is continuously rotated again, and the duplicating reference beam 85a is radiated for the duration of one revolution (360°). The above-mentioned procedure is repeated to thereby finally obtain the duplicate hologram recording medium 80B onto which holograms of all the planned duplication regions of the duplication master 60B have been duplicated.

According to still another procedure, the spindle-motor rotating shaft 98a for rotating the duplication master 60B and the duplicate hologram recording medium 80A together is continuously rotated, and the laser light source 88 is moved from the inner periphery toward the outer periphery. At this time, the spindle-motor rotating shaft 98a and the laser light source 88 are moved at such moving speed allowing the duplicating reference beam 85a to be radiated to all of the planned duplication regions of the duplication master 60B. In this way, it is possible to finally obtain the duplicate hologram recording medium 80B onto which holograms of all the planned duplication regions of the duplication master 60B have been duplicated.

In any of the above-described procedures, the movement of the duplicating reference beam 85a in the Y-axis direction (the movement direction is indicated by an arrow denoted by symbol Y in FIG. 15) is effected by the movement of the laser light source 88, and the movement of the duplicating reference beam 85a in the rotation angle direction (the movement direction is indicated by an arrow denoted by symbol R2 in FIG. 15) is effected by using the spindle motor 98, thereby radiating the duplicating reference beam 85a to all of the regions where duplication is to be performed. In this embodiment, the laser light source 88 has a function of generating the duplicating reference beam 85a, and the spindle motor 98, the laser light source 88, and the actuator for moving the laser light source 88 each have a function of radiating the duplicating reference beam 85a to a predetermined region on the duplication master 60B. Each one of these members constitutes a part of the duplicating-reference-beam generating section.

By using the duplicate-hologram-recording-medium production apparatus 140 according to the first embodiment, the diffracted beam 95 can be generated from the duplication master 60B by radiating the duplicating reference beam 85a, and only the diffracted beam 95 can be radiated to the duplicate hologram recording medium 80A while blocking the duplicating reference beam 85a through the action of the angle selective plate 90. As a result, the speed of duplicating the duplicate hologram recording medium 80B can be increased by increasing the speed of rotation of the duplication master 60B without using an expensive objective lens with a large aperture such as the one adopted in the related art.

(With Regard to the Production Technique According to the Second Embodiment for Producing a Duplicate Hologram Recording Medium from the Duplication Master 60B)

As the technique for producing a duplicate hologram recording medium from the duplication master 60B, the production apparatus according to the second embodiment, and the production method according to the second embodiment which uses this production apparatus will be described. According to the production apparatus and the production method, duplication is performed by radiating a band of light to the duplication master 60B, and scanning this band of light in the one-dimensional direction. The scanning in the one-dimensional direction in this case is performed by rotating the duplication master 60B. A duplicate-hologram-recording-medium production apparatus 150 according to the second embodiment will be described with reference to FIG. 16.

Figure 16:
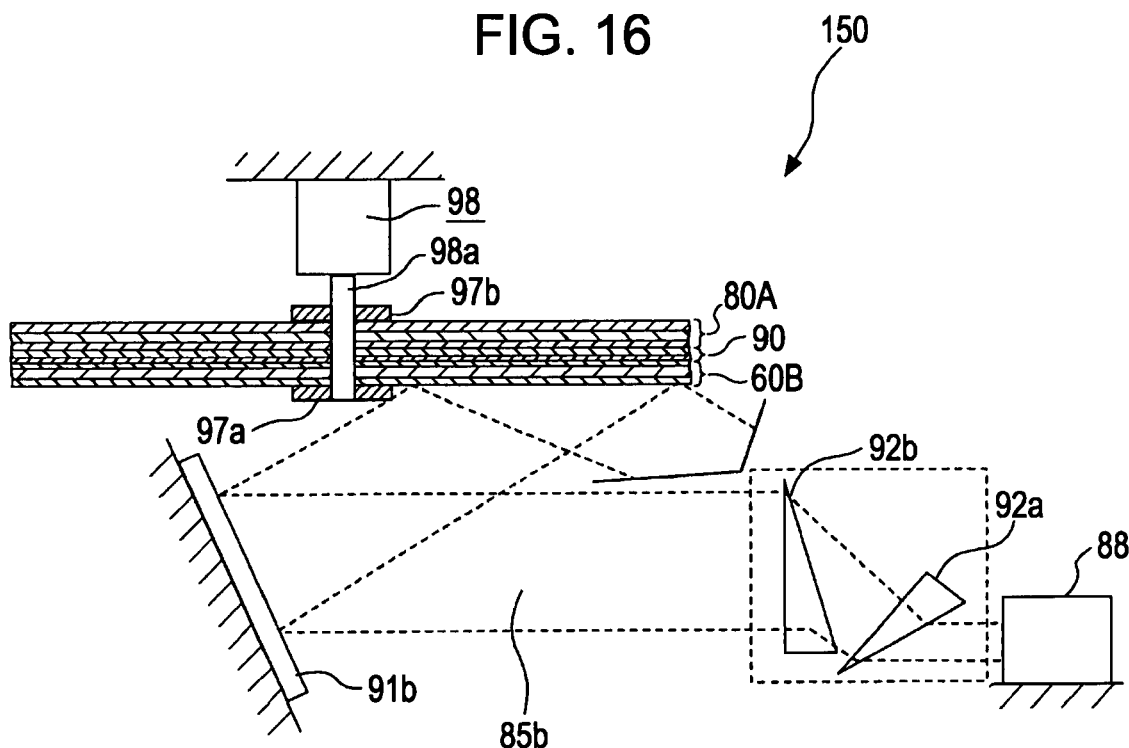
FIG. 16 is a conceptual view of a duplicate-hologram recording-medium production apparatus.

The duplicate-hologram-recording-medium production apparatus 150 according to the second embodiment shown in FIG. 16 has the laser light source 88, an anamorphic prism 92a, an anamorphic prism 92b, a mirror 91b, the spindle motor 98, and the duplication master 60B as its main components. The laser light source 88, the anamorphic prism 92a, the anamorphic prism 92b, the mirror 91b, and the spindle motor 98 are all secured to a reference base. The duplicating reference beam 85b shaped into a band-like form can be obtained by shaping a light beam from the laser light source 88 by the anamorphic prism 92a and the anamorphic prism 92b. Here, the reason for using two anamorphic prisms, the anamorphic prism 92a and the anamorphic prism 92b, is to make the longitudinal length of the band-shaped duplicating reference beam 85a substantially equal to the length of the radius of the duplication master 60B so that it is unnecessary to scan the duplicating reference beam 85a in the direction of the radial lines extending from the center of the duplication master 60B. Therefore, if the use of only the anamorphic prism 92a suffices to make the longitudinal length of the duplicating reference beam 85a sufficiently large, the anamorphic prism 92b is not required.

Figure 17:
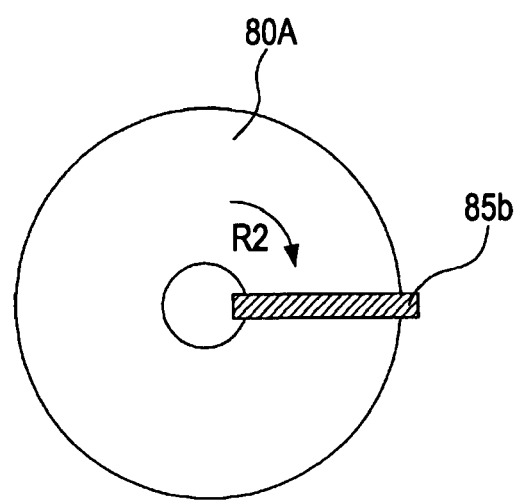
FIG. 17 is a perspective view of a duplicate hologram recording medium as seen from above, illustrating a duplicating reference beam formed as a band of light.

FIG. 17 is a perspective view of the duplicate hologram recording medium 80A as seen from above, illustrating the relationship between the duplicate hologram recording medium 80A and the duplicating reference beam 85b formed as a band of light. In this case, when producing the duplication master 60B, the duplicating reference beam 85b is made incident at the same incidence angle as that of the master-producing reference beam 76b used as shown in FIGS. 8A to 8D. That is, the duplicating reference beam 85b is radiated radially with reference to the center of the duplication master 60B (in FIG. 14, the center of rotation of the spindle-motor rotating shaft 98a), and holograms are sequentially formed as the duplication master 60B and the duplicate hologram recording medium 80A rotate, finally producing the duplicate hologram recording medium 80B with holograms recorded thereon. That is, the duplicating reference beam 85b is scanned one-dimensionally by moving the duplicate hologram recording medium 80A in the rotation angle direction (indicated by an arrow denoted by symbol R2 in FIG. 17) in accordance with the rotation of the spindle-motor rotating shaft 98a.

In this way, it is possible to finally obtain the duplicate hologram recording medium 80B onto which holograms of all the planned duplication regions of the duplication master 60B have been duplicated. In this embodiment, the laser light source 88 has a function of generating the duplicating reference beam 85a, and the spindle motor 98, the anamorphic prism 92a, the anamorphic prism 92b, and the mirror 91b each have a function of radiating the duplicating reference beam 85a to a predetermined region on the duplication master 60B. Each one of these members constitutes a part of the duplicating-reference-beam generating section.

By using the duplicate-hologram-recording-medium production apparatus 150 as described above, the duplicate hologram recording medium 80B can be obtained easily and at high speed by rotating the spindle-motor rotating shaft 98a one revolution.

(With Regard to the Production Technique According to the Third Embodiment for Producing a Duplicate Hologram Recording Medium from the Duplication Master 60C and the Duplication Master 60D)

As the technique for producing a duplicate hologram recording medium by using the duplication master 60C and the duplication master 60D, a duplicate-hologram-recording-medium production apparatus 160 according to the third embodiment, and the production method according to the third embodiment using this production apparatus will be described. According to the production apparatus and the production method, light beams are radiated at once over an area covering the entire duplication master 60C or duplication master 60D, thereby making it possible to obtain a hologram recording medium with holograms recorded thereon, without light beam scanning.

Figure 18:
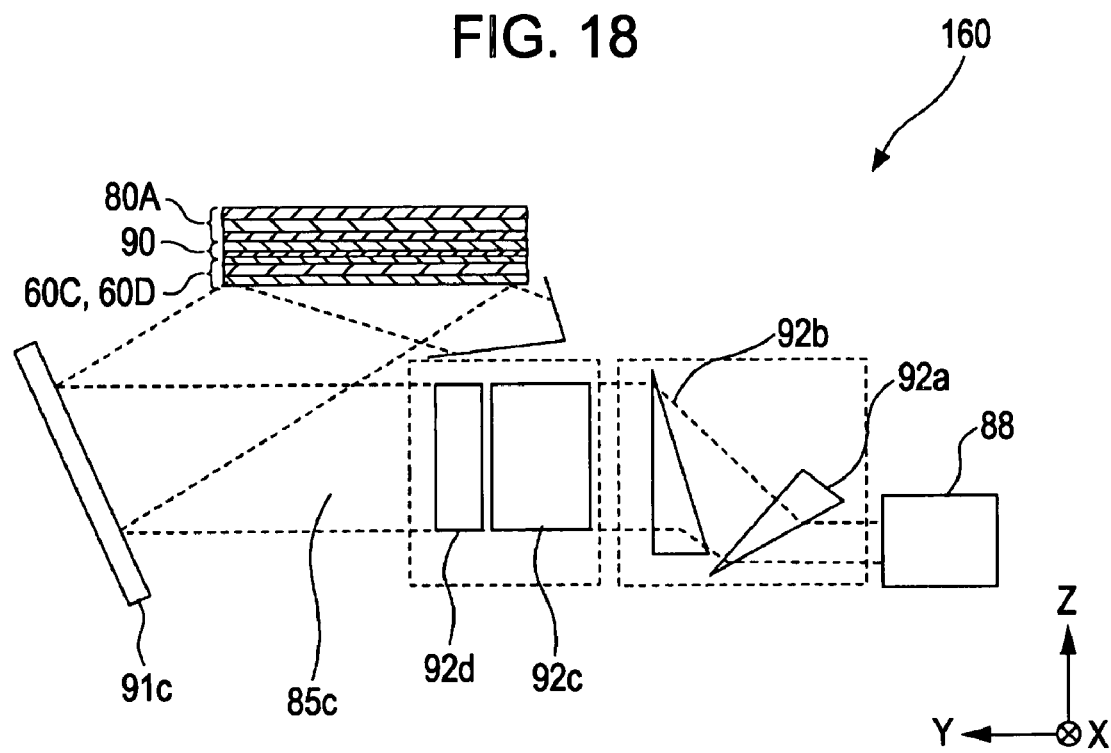
FIG. 18 is a conceptual view of a duplicate-hologram recording-medium production apparatus.

FIG. 18 shows a duplicate-hologram-recording-medium production apparatus 160 according to the third embodiment. The duplicate-hologram-recording-medium production apparatus 160 according to the third embodiment has the laser light source 88, the anamorphic prism 92a, the anamorphic prism 92b, an anamorphic prism 92c, an anamorphic prism 92d, a mirror 91c, and the duplication master 60C or the duplication master 60D as its main components. The above-mentioned components are all secured to a reference base. A light beam from the laser light source 88 has its width enlarged in the plane including the Y axis and the Z axis shown in FIG. 18 by the anamorphic prism 92a and the anamorphic prism 92b. Further, the width of the light beam is enlarged in the plane including the X axis and the Y axis shown in FIG. 18 by the anamorphic prism 92c and the anamorphic prism 92d. As a result, a duplicating reference beam whose cross section taken along the X axis and the Z axis is a square is obtained as a duplicating reference beam 85c. Here, the reason for using four anamorphic prisms, the anamorphic prisms 92a to 92d, is to ensure that the duplicating reference beam 85c can be radiated over the entire surface of the duplication master 60C or duplication master 60D. Therefore, when the surface area of the duplication master 60C or duplication master 60D to which the duplicating reference beam 85c is radiated is small, a sufficient radiation area for the duplicating reference beam 85c can be secured by the anamorphic prism 92a and the anamorphic prism 92c.

Figure 19:
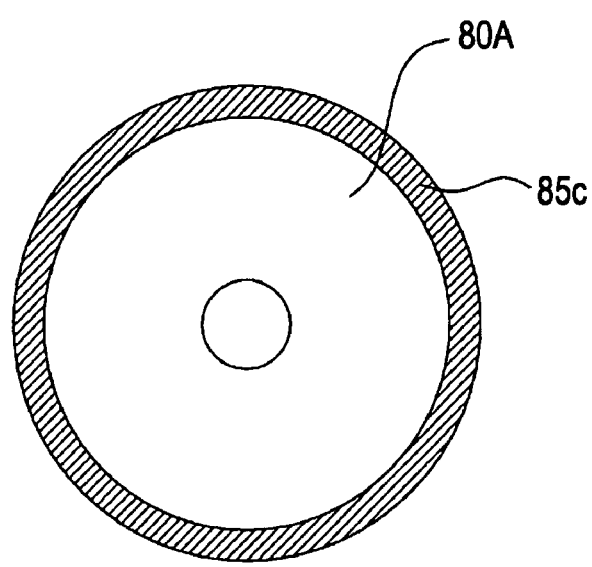
FIG. 19 is a perspective view of a duplicate hologram recording medium as seen from above, illustrating a two-dimensionally enlarged duplicating reference beam.

FIG. 19 is a perspective view of the duplicate hologram recording medium 80A as seen from above, illustrating the relationship between the duplicate hologram recording medium 80A and the duplicating reference beam 85c enlarged two-dimensionally. In this case, when producing the duplication master 60C or the duplication master 60D, the duplicating reference beam 85c is radiated from the same incidence direction as that of the master-producing reference beam indicated by the arrow as shown in FIG. 10D. That is, by radiating the duplicating reference beam 85c, a duplicate hologram recording medium 80C is produced when using the duplication master 60C, and a duplicate hologram recording medium 80D is produced when using the duplication master 60D. In this embodiment, the laser light source 88 has a function of generating the duplicating reference beam 85c, and the mirror 91c, the anamorphic prism 92a, the anamorphic prism 92b, the anamorphic prism 92c, and the anamorphic prism 92d each have a function of radiating the duplicating reference beam 85c to a predetermined region on the duplication master 60C or the duplication master 60D. Each one of these members constitutes a part of the duplicating-reference-beam generating section.

Further, in the duplicate-hologram-recording-medium production apparatus 160 as described above, a plurality of duplicate hologram recording media 80A are continuously moved by using a transport device (not shown) and, as shown in FIG. 18, sequentially stopped above the angle selective plate 90 on the lower surface of which the duplication master 60C or the duplication master 60D is arranged, and the duplicating reference beam 85c is radiated thereto, thereby making it possible to continuously obtain the duplicate hologram recording media 80C or the duplicate hologram recording media 80D on which holograms are formed. Although the mechanism for stopping the movement above the duplication mater 60C or the duplication master 60D in such batch processing is not shown, this is one that is commonly used in the production process of various kinds of product. For example, the duplicate hologram recording medium 80A is lifted by a lift and moved, and the lift is lowered upon detecting by an optical sensor (not shown) that the duplicate hologram recording medium 80A has reached a position above the duplication master 60C or the duplication master 60D, thereby setting the duplicate hologram recording medium 80A and the duplication master 60C or the duplication master 60D at predetermined relative positions. This mechanism serves as an embodiment of the positioning section.

Each of the duplicate hologram recording media 80B to 80D produced by the production apparatuses according to the first to third embodiments or the production methods according to the first to third embodiments can be mass-duplicated for distribution as a duplicate hologram recording medium. In this case, if a specific region of the duplicate hologram recording medium is left as a hologram non-recorded region, a person who has acquired such a duplicate hologram recording medium can write (additional write) necessary recording data into this non-recorded region.

In the case where no additional write is performed with respect to the duplicate hologram recording media 80B to 80D produced by the production apparatuses according to the first to third embodiments and the production methods according to the first to third embodiments, it is desirable to perform post processing by radiating light of poor coherence to the duplicate hologram recording media. The post processing refers to the processing of changing all the monomers that have remained in duplicate hologram recording media into polymers. Any light can be used as the light to be radiated as long as it has a wavelength to which media have sensitivity and is poor in coherence. For example, light beams emitted by LEDs may be radiated to the duplicate hologram recording media at once. This disables an additional write to the duplicate hologram recording media.

Each of the duplicate hologram recording media 80B to 80D produced by using the above-described production apparatuses according to the first to third embodiments is a hologram recording medium from which reproduction can be performed by a recording and reproduction apparatus having the optical section shown in FIG. 1 and which is of a type that detects a reflected diffracted beam. In this regard, when forming a hologram recording medium of a type that detects a diffracted beam transmitted therethrough, the duplicate hologram recording medium 80A may be provided with no reflective layer 80d.

The duplicate hologram recording medium 80B obtained as described above allows reproduction to be readily performed by an ordinary reproduction method using a hologram reproduction apparatus having the optical section 10 shown in FIG. 1. Further, the duplicate hologram recording medium 80C obtained as described above allows reproduction to be performed by the reproduction method in which a reconstructed image obtained by the image sensor 29 is rotated as described above using the hologram reproduction apparatus having the optical section 10 shown in FIG. 1. Further, the duplicate hologram recording medium 80D allows reproduction to be readily performed by an ordinary reproduction method using the hologram reproduction apparatus having the optical section 10 shown in FIG. 1.

(With Regard to Modifications of the Technique for Producing a Duplication Master and of the Technique for Producing a Duplicate Hologram Recording Medium)

(First Modification)

A technique representing a first modification of each of the technique for producing a duplication master and the technique for producing a duplicate hologram recording medium described above will be described below.

Figure 20:
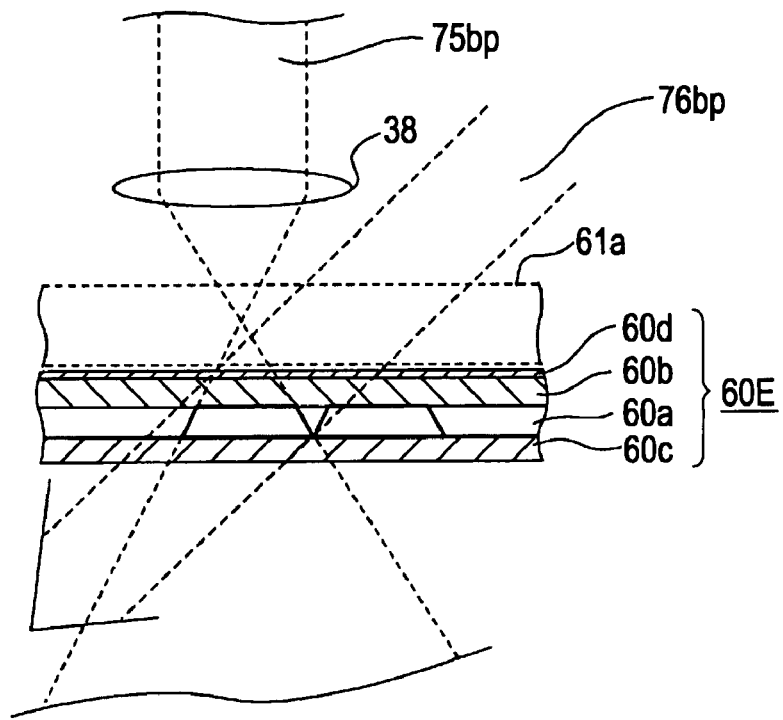
FIG. 20 is a partial enlarged view, showing a case where the duplication master of the optical section shown in FIG. 4 is replaced with a duplication master having a polarization-dependent angle selective film.

A characteristic feature of the first modification of the technique for producing a duplication master resides in the use of a duplication master 60E shown in FIG. 20 instead of the duplication master 60A while adopting the same configuration for the optical section shown in each of FIGS. 4, 6, 9, 11.

The duplication master 60E shown in FIG. 20 differs from the duplication master 60A in that the duplication master 60E includes a polarization-dependent angle selective film 60d whose transmittance varies in accordance with the polarization direction of a light beam and the incidence angle of a light beam. The difference between the polarization-dependent angle selective film 60d and the angle selective film 90a shown in FIG. 12 is that while the transmittance of the angle selective film 90a varies in accordance with the incidence angle of a light beam, the transmittance of the polarization-dependent angle selective film 60d varies also in accordance with the polarization direction of a light beam.

Figure 21:
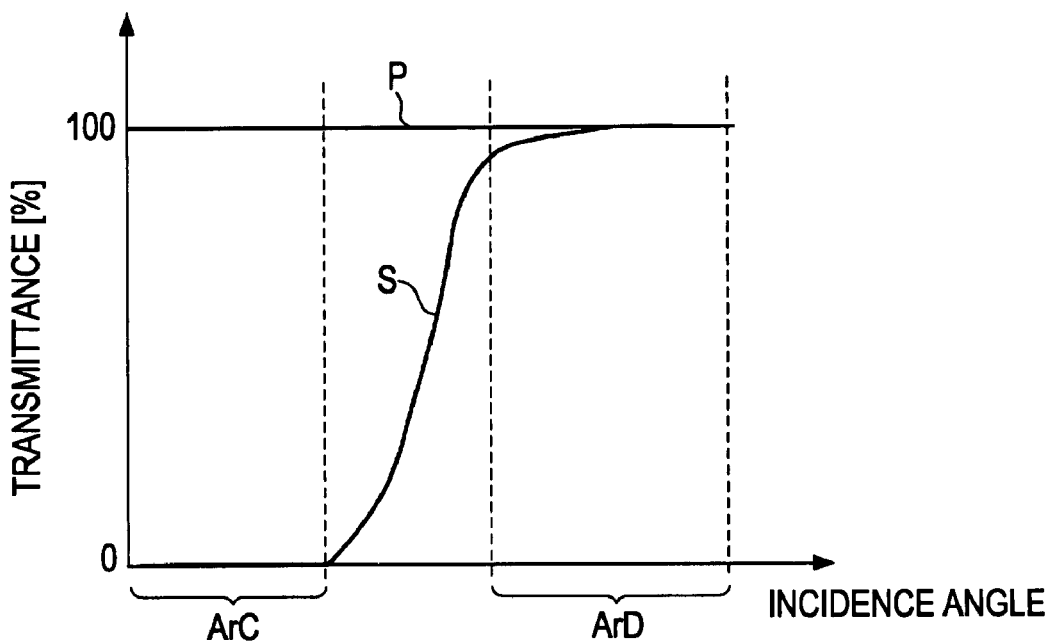
FIG. 21 is a diagram showing the characteristics of a polarization-dependent angle selective film.

FIG. 21 shows the characteristics of the polarization-dependent angle selective film 60d. The vertical axis in FIG. 21 indicates transmittance, the horizontal axis indicates incidence angle, the graph denoted by symbol P indicates the transmittance of P-polarized light waves, and the graph denoted by symbol S indicates the transmittance of S-polarized light waves. As shown in FIG. 21, the transmittance of P-polarized light waves is 100% (total transmission) irrespective of the incidence angle. S-polarized light waves are transmitted when the incidence angle is large, and are not transmitted when the incidence angle is small. The amount of transmission is dependent on the incidence angle. The technique for forming the above-mentioned polarization-dependent angle selective film 60d on the holding substrate 60b is known in the art, and there is no particular technical difficulty involved in the production of the duplication master 60E having the above-mentioned polarization-dependent angle selective film 60d itself.

At the production stage of a duplication master, the duplication master is produced using the duplication master 60E instead of the duplication master 60A, by an apparatus for producing a hologram duplication master which includes an optical section that is otherwise configured in the same manner as the optical section shown in each of FIGS. 2, 6, 9, 11. In the following description, a duplication master on which holograms produced in this way are formed is denoted as a duplication master 60F. It should be noted that in the following description, as described above, a duplication master having the polarization-dependent angle selective film 60d and on which holograms have not been recorded is denoted as the duplication master 60E, and a duplication master onto which holograms are being recorded but have not been recorded in all of the planned recording regions is also denoted as the duplication master 60E. In FIG. 21, the region shown as the duplicating-reference-beam angle region ArC represents an expected angular range for the incidence angle of a duplicating reference beam, and the region shown as the diffracted-beam angle region ArD represents the expected angular range for the incidence angle of a diffracted beam.

The process of producing the duplication master 60F from the duplication master 60E will be described. Substantially the same production process as that described above with reference to each of FIGS. 2, 6, 9, 11 is adopted as this production process. This production process will be described with reference to FIG. 20.

In FIG. 20, indicated as a modulated coaxial beam 75bp is a coaxial beam that has undergone spatial modulation in the same manner as the modulated coaxial beam 75b described above. Further, the modulated coaxial beam 75bp is formed as an S-polarized light wave. Further, indicated as a master-producing reference beam 76bp is a master-producing reference beam that is made incident on the duplication master 60E via the same optical path as that for the master-producing reference beam 76b described above. The master-producing reference beam 76bp is formed as an S-polarized light wave. Here, in the optical section shown in each of FIGS. 2, 6, 9, and 11, both the modulated coaxial beam 75bp and the master-producing reference beam 76bp can be made S-polarized light waves by rotating and adjusting each of the half-wave plate 41 and half-wave plate 42.

While FIG. 20 shows an example in which the objective lens 38 and the dummy glass 61b are used to condense light and correct for an aberration occurring in the duplicate hologram recording medium 80A in advance, it is also possible to use the aberration-corrected objective lens 39 instead of the combination of the objective lens 38 and the dummy glass 61b to correct for an aberration occurring the duplicate hologram recording medium 80A in advance without using the dummy glass 61b.

As described above, the modulated coaxial beam 75bp and the master-producing reference beam 76bp as P polarized light waves are both made incident on the duplication master 60E, and are transmitted 100% through the polarization-dependent angle selective film 60d irrespective of their incidence angles because these are both P-polarized light waves. Then, the modulated coaxial beam 75bp and the master-producing reference beam 76bp come into interference with each other in the recording layer 60a formed of a photopolymer, thus forming a hologram. In this way, holograms are recorded onto all the planned regions of the recording layer 60a, and the above-described post processing of changing monomers into polymers is performed, thereby completing the duplication master 60F. Here, duplication masters completed in this way are respectively referred to as the duplication master 60F, a duplication master 60G, and a duplication master 60H, assuming that the configuration of holograms recorded in the recording layer 60a of the duplication master 60F is the same as that of the duplication master 60B, the configuration of holograms recorded in the recording layer 60a of the duplication master 60G is the same as that of the duplication master 60C, and the configuration of holograms recorded in the recording layer 60a of the duplication master 60G is the same as that of the duplication master 60D.

Figure 22:
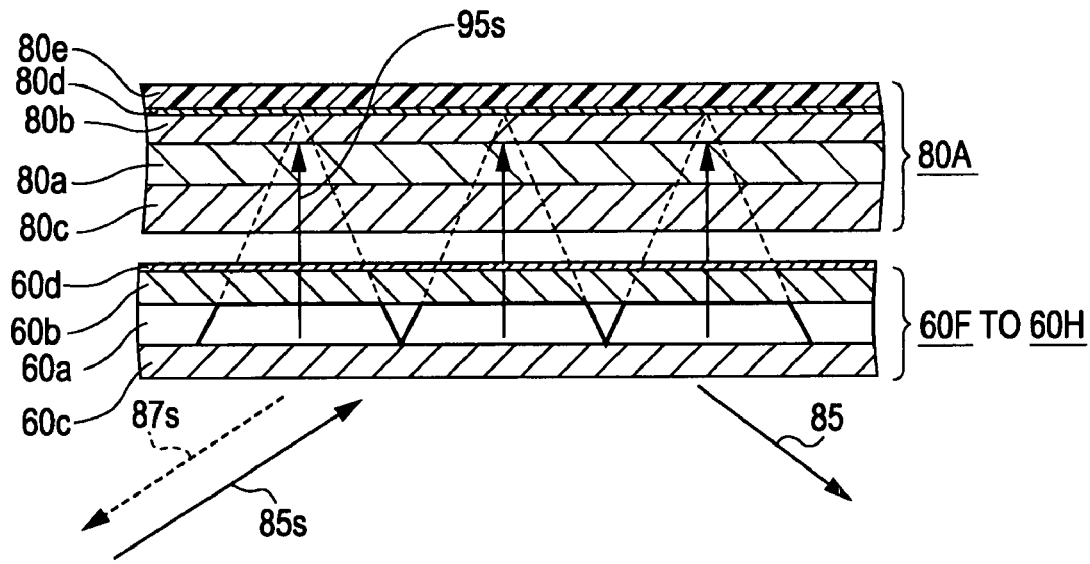
FIG. 22 is a partial enlarged view of the hologram-forming region of a duplicate hologram recording medium.

Referring to FIG. 22, description will be given of the technique of recording holograms onto the duplicate hologram recording medium 80A on which no hologram has been recorded, thereby producing each of the duplicate hologram recording medium 80B, the duplicate hologram recording medium 80C, and the duplicate hologram recording medium 80D. Here, a hologram recording medium produced by using the duplication master 60F is denoted as the hologram recording medium 80B, a hologram recording medium produced by using the duplication master 60G is denoted as the hologram recording medium 80C, and a hologram recording medium produced by using the duplication-master 60H is denoted as the hologram recording medium 80G.

The duplication of each one of the duplicate hologram recording media 80B to 80D by using each one of the duplication masters 60F to 60H is performed by making the polarization-dependent angle selective film 60d of each one of the duplication masters 60F to 60H face the holding substrate 80c of the duplicate hologram recording medium 80A, and radiating a duplicating reference beam 85S, which is in phase conjugation with the master-producing reference beam 76bp but is an S polarized light wave, from the holding substrate 60c side of each one of the duplication masters 60F to 60H. In this case, when the incidence angle of the duplicating reference beam 85S is set so as to fall within the range of the region indicated as the duplicating-reference-beam angle region ArC, the duplicating reference beam 85S is not transmitted through the polarization-dependent angle selective film 60d. As a result, the duplicating reference beam 85S does not reach the recording layer 80a of the duplicate hologram recording medium 80A.

Figure 23:
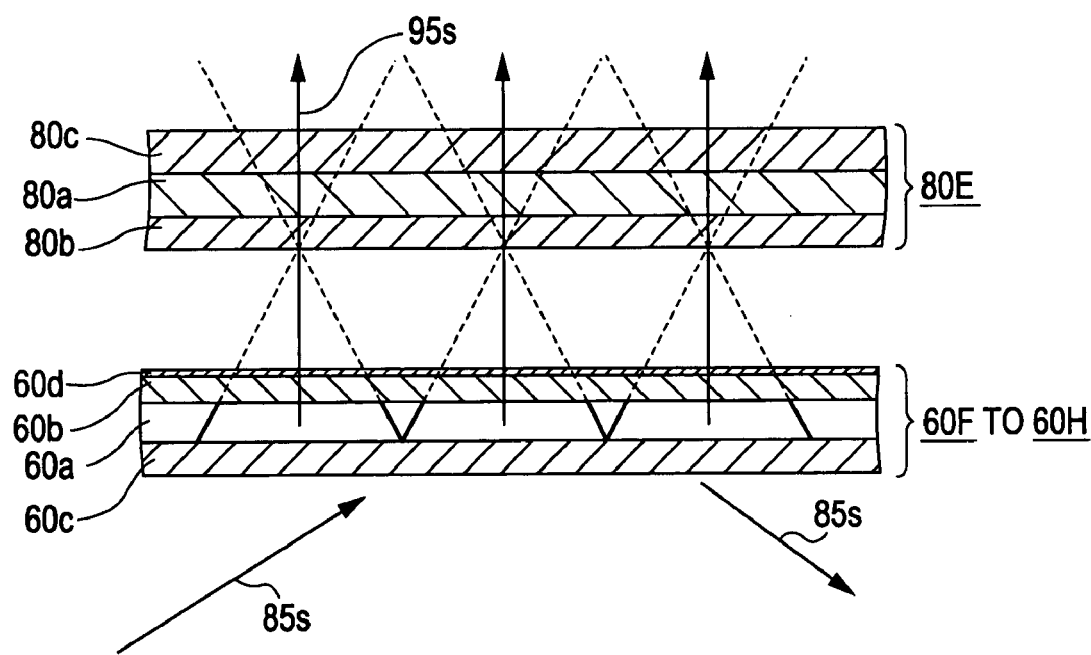
FIG. 23 is a partial enlarged view of the hologram-forming region of a duplicate hologram recording medium when condensing the diffracted beam at a different condensing position.

On the other hand, as shown in FIG. 22, a diffracted beam 95S from each one of the duplication masters 60F to 60H, which is generated upon radiating the duplicating reference beam 85S that is an S-polarized light wave, is made incident on the polarization-dependent angle selective film 60d at an incidence angle that is nearly perpendicular to the polarization-dependent angle selective film 60d and falls within the range of the diffracted-beam angle region ArD. The diffracted beam 95S is thus transmitted through the polarization-dependent angle selective film 60d. As a result, the diffracted beam 95S forms a hologram corresponding to the diffracted beam 95S in the recording layer 80a of the duplicate hologram recording medium BOA. Accordingly, the diffracted beam 95S (first diffracted beam) that has contributed to the formation of a hologram is reflected by the reflective layer 80d of the duplicate hologram recording medium 80A, and irradiates the recording layer 80a of the duplicate hologram recording medium 80A again to generate a diffracted beam 87S again. As shown in FIG. 23, the diffracted beam 87S exits from each one of the duplication masters 60F to 60H.

Here, as for the beam shape of the duplicating reference beam 85S, when using the duplication master 60F, the duplicating reference beam 85S may be formed as a spot-shaped light beam like the duplicating reference beam 85a shown in FIGS. 14 and 15, or a one-dimensional band-shaped light beam like the duplicating reference beam 85*b* shown in FIGS. 16 and 17. Further, when using the duplication master 60G and the duplication master 60H, the duplicating reference beam 85S can be formed as a two-dimensional enlarged light beam like the duplicating reference beam 85*c* shown in FIGS. 18 and 19.

Each of the duplicate hologram recording media 80B to 80D produced as described above can be mass-duplicated for distribution as a duplicate hologram recording medium. In this case, if a specific region of the duplicate hologram recording medium is left as a hologram non-recorded region, a person who has acquired such a duplicate hologram recording medium can write (additional write) necessary recording data into this non-recorded region.

In the case where no additional write is performed with respect to the duplicate hologram recording media 80B to 80D, it is desirable to perform post processing by radiating light of poor coherence to the duplicate hologram recording media. The post processing refers to the processing of changing all the monomers that have remained in duplicate hologram recording media into polymers. Any light can be used as the light to be radiated as long as it has a wavelength to which media have sensitivity and is poor in coherence. For example, light beams emitted by LEDs may be radiated to the duplicate hologram recording media at once. This disables an additional write to the duplicate hologram recording media.

(Second Modification)

Referring to FIG. 23, a second modification of the production technique at the production stage of a duplicate hologram recording medium will be described. This modification represents a technique that is suitable for cases where a duplicate hologram recording medium of a type that obtains a transmitted diffracted beam is to be produced instead of a reflection-type duplicate hologram recording medium.

As shown in FIG. 23, the duplication masters 60F to 60H, and the duplicate hologram recording medium 80E with no reflective layer, which is a duplicate hologram recording medium on which holograms have not been recorded and which has the recording layer 80*a*, the holding substrate 80*b*, and the holding substrate 80*c*, are arranged at a spacing larger than that in each of the above-described embodiments. By providing the spacing of a size shown in FIG. 23, holograms are formed on the duplicate hologram recording medium 80E by the diffracted beam 95 that has been condensed, thereby producing the duplicate hologram recording medium 80F, the duplicate hologram recording medium 80G, and the duplicate hologram recording medium 80H when using the duplication master 60F, the duplication master 60G, and the duplication master 60H, respectively.

When adopting the above-mentioned arrangement, as in the arrangement shown in FIG. 22, the diffracted beam 95S, which is generated by radiating the duplicating reference beam 85S as an S-polarized light wave to the duplication master 60F, is radiated to the duplicate hologram recording medium 80E. However, the diffracted beam 95S is radiated from the holding substrate 60*b* side. In this case, when, as described above, the incidence angle of the duplicating reference beam 85S is set so as to fall within the range of the region indicated as the duplicating-reference-beam angle region ArC, the duplicating reference beam 85S is not transmitted through the polarization-dependent angle selective film 60*d*. As a result, the duplicating reference beam 85S does not reach the recording layer 80*a* of the duplicate hologram recording medium 80E.

On the other hand, the diffracted beam 95S from the duplication masters 60F to 60H, which is generated upon radiating the duplicating reference beam 85S, is made incident at an incidence angle that falls within the range of the diffracted-beam angle region ArD. The diffracted beam 95S is thus transmitted through the polarization-dependent angle selective film 60*d*. As a result, the diffracted beam 95S forms a hologram corresponding to the diffracted beam 95S in the recording layer 80*a* of the duplicate hologram recording medium 80E. However, since no reflective layer is provided unlike in FIG. 22, the diffracted beam 95S exits from the holding substrate 80*c* without returning toward the duplication masters 60F to 60H again. As for the radiation method of the duplicating reference beam 85S, when using the duplication master 60F, the duplicating reference beam 85S may be formed as a spot-shaped light beam like the duplicating reference beam 85*a* shown in FIGS. 14 and 15, or a one-dimensional band-shaped light beam like the duplicating reference beam 85*b* shown in FIGS. 16 and 17. When using the duplication master 60G and the duplication master 60H, the duplicating reference beam 85S may be formed as a two-dimensional enlarged light beam like the duplicating reference beam 85*c* shown in FIGS. 18 and 19.

Each of the duplicate hologram recording media 80F to 80H produced as described above can be mass-duplicated for distribution as a duplicate hologram recording medium. In this case, if a specific region of the duplicate hologram recording medium is left as a hologram non-recorded region, a person who has acquired such a duplicate hologram recording medium can write (additional write) necessary recording data into this non-recorded region. In the case where no additional write is performed with respect to the duplicate hologram recording media 80F to 80H, it is desirable to perform post processing by radiating light of poor coherence to the duplicate hologram recording media.

Figure 24A:
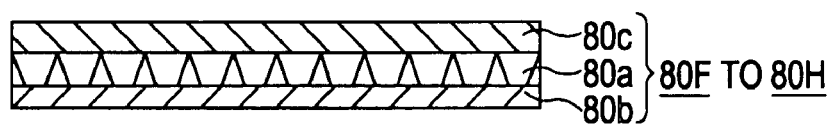
FIGS. 24A to 24C are views showing the process of producing a reflective layer of a duplicate hologram recording medium.
Figure 24B:
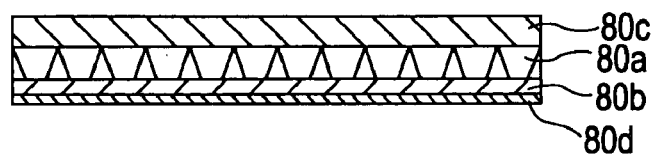
Figure 24C:
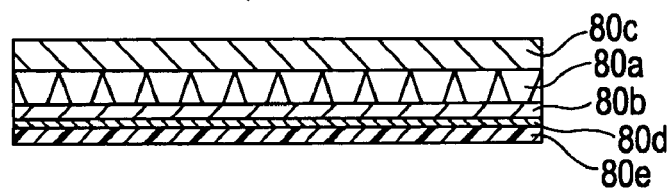

FIGS. 24A to 24B are views showing the process of producing a duplication hologram recording medium having a reflective layer from each one of the duplicate hologram recording media 80F to 80H with no reflective layer that are produced in this way. FIG. 24A shows one of the duplicate hologram recording media 80F to 80H. FIG. 24B shows the process of providing the reflective layer 80*d* through sputtering or the like. FIG. 24C shows the process of providing the protective layer 80*e* through spin-coating or the like.

(Third Modification)

Figure 25:
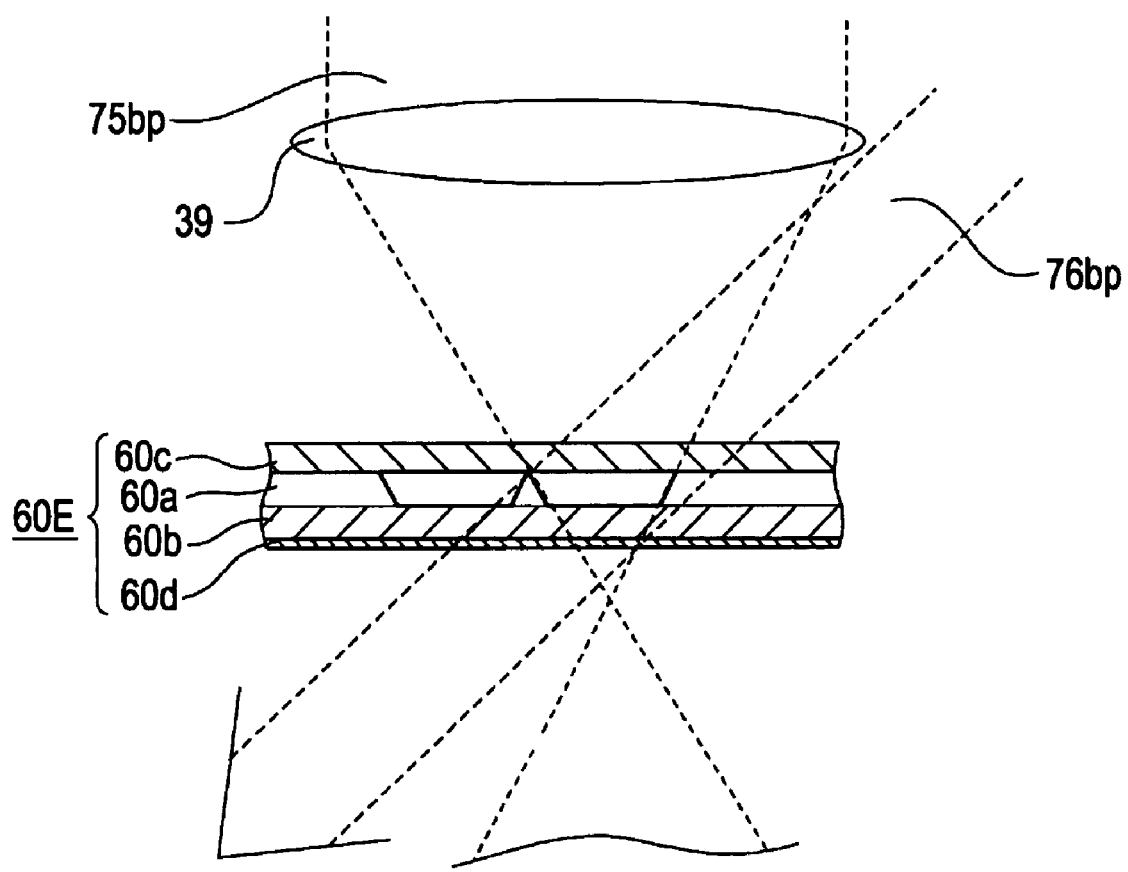
FIG. 25 is a partial enlarged view of the hologram-forming region of a duplicate hologram recording medium when condensing the modulated coaxial beam at a different condensing position.

A third modification shown in FIG. 25 will be described. According to the third modification, when recording holograms onto the duplication master 60E, holograms are recorded into the recording layer 60*a* after the modulated coaxial beam 75*bp* is temporarily condensed. Here, used as an objective lens for condensing the modulated coaxial beam 75*bp* is the objective lens 39 that is corrected in advance for an aberration generated in a duplicate hologram recording medium. When using the objective lens 39 as described above, the dummy glass 61*a* such as the one shown in FIG. 20 can be made unnecessary, which proves advantageous in that the objective lens 39 and the duplication master 60E can be arranged at a close distance from each other. A duplication master obtained according to the third modification described above has the same configuration as those of the duplication masters 60F to 60H.

In each one of the first to third modifications described above, whether to adopt the combination of the objective lens 38 and the dummy glass 61*a* or to adopt the objective lens 39 can be selected in an arbitrary manner. Further, in each one of the first to third modifications, the description is directed to the case of adopting a combination in which the modulated coaxial beam and the master-producing reference beam are formed as P-polarized light waves and the duplicating reference beam is formed as an S-polarized light wave. However, by employing such a film design as to make the transmittance characteristics shown in FIG. 21 reverse for the P-polarized light waves and the S-polarized light waves, it is possible to adopt a combination in which the modulated coaxial beam and the master-producing reference beam are formed as S-polarized light waves, and the duplicating reference beam is formed as a P-polarized light wave. Further, in each one of the first to third modifications, the description is directed to the case of the duplication master 60E having the polarization-dependent angle selective film 60d formed on a duplication master. However, it is also possible to form a polarization-dependent angle selective plate, which has a structure similar to that of the angle selective plate 90 shown in FIG. 12 and includes a polarization-dependent angle selective film arranged on a glass substrate, as a separate member, and use this polarization-dependent angle selective plate instead of the angle selective plate 90 in FIG. 12 to thereby produce a duplicate hologram recording medium.

(Modifications of the Shape of a Duplication Master and of the Shape of a Duplicate Hologram Recording Medium)

While the above description is directed to the case where both the duplication master and the duplication hologram recording medium are disc-shaped, the duplication master and the duplication hologram recording medium may be card-shaped (rectangular or square). In this case as well, it is possible to produce a duplication master and a duplicate hologram recording medium by using the same principle as described above, and further, it is possible to provide an apparatus for producing a duplication master and an apparatus for producing a duplicate hologram recording medium which use the same principle as described above.

That is, when producing a disc-shaped duplication master, holograms are formed across the two-dimensional surface of the duplication master through the movement of a light spot in the tangential direction (circumferential direction) and the radial direction (direction of radius). On the other hand, in the case of a card-shaped duplication master, holograms are formed on the two-dimensional surface by scanning the relative positions of a light spot and the card-shaped duplication master in two mutually orthogonal directions along the X and Y axes. For a duplication-master production apparatus, the configuration of the production apparatus employed in the case of producing a disc-shaped duplication master described above can be adopted as it is, except that the duplication-master production apparatus includes a mechanism for changing the relative positions of a light spot and a card-shaped duplication master in the X-axis and Y-axis directions.

Further, in the production of a duplicate hologram recording medium, in a case where the duplicate hologram recording medium is produced by scanning a light spot two-dimensionally, if the duplicate hologram recording medium is disc-shaped, the formation of holograms onto the duplicate hologram recording medium is performed by moving the light spot in the tangential direction (circumferential direction) and the radial direction (direction of radius). On the other hand, in the case of a card-shaped duplicate hologram recording medium, the formation of holograms onto the duplicate hologram recording medium is performed by scanning the relative positions of a light spot and a card-shaped duplication master in two mutually orthogonal directions along the X and Y axes. Further, in a case where a duplicate hologram recording medium is produced by scanning a light beam in the one-dimensional direction, the formation of holograms onto the duplicate hologram recording medium is performed by scanning a one-dimensional light beam, which extends in the one-dimensional direction, in a direction orthogonal to the extending direction of the light beam. Further, in the case of using light beams having a two-dimensional area, the light beams are radiated at once as in the case of a disc-shaped duplicate hologram recording medium.

Further, in the duplication-master production apparatus, when the duplication master is disc-shaped, an operation such as taking the synchronization between the incidence angle of a reference beam and the rotation of a duplication master is required for facilitating the production of a duplicate hologram recording medium. However, in the case of producing a card-shaped duplication master in which the production apparatus is operated with reference to an orthogonal coordinate system defined by the X axis and the Y axis, such complicated processing is not required, thereby making it possible to simplify the mechanism of the duplication-master production apparatus.

Each of the above-mentioned embodiments is merely illustrative of one embodiment of the present invention, and the present invention is not limited to the above-described embodiments. For example, the shape of the duplication master or duplicate hologram recording medium is not limited to a disc shape or card shape, and the structures of the respective layers of the duplication master and duplicate hologram recording medium are not limited to those of the above-described embodiments. It is a matter of course that any and all modifications and combinations of embodiments that fall within the scope of the same technical idea are covered by the scope of the present invention.

What is claimed is:

1. An apparatus for producing a duplication master used for duplicating a hologram carrying recording data onto a duplicate hologram recording medium, comprising:
    a beam splitter that splits a light beam from a laser light source into a coaxial beam and a master-producing reference beam;
    a spatial light modulator that performs spatial light modulation on the coaxial beam to generate a modulated coaxial beam in which a predetermined reference beam and a signal beam corresponding to recording data are arranged coaxially;
    condenser means for condensing the modulated coaxial beam to a recording layer of the duplication master while correcting for an aberration generated when duplicating the duplicate hologram recording medium in advance; and
    hologram-forming-position moving means for moving a position of the recording layer where a hologram is formed due to interference between the master-producing reference beam and the modulated coaxial beam.

2. An apparatus for producing a duplication master used for duplicating a hologram carrying recording data onto a duplicate hologram recording medium, comprising:
    a beam splitter that splits a light beam from a laser light source into a coaxial beam and a master-producing reference beam;
    a spatial light modulator that performs spatial light modulation on the coaxial beam to generate a modulated coaxial beam in which a predetermined reference beam and a signal beam corresponding to recording data are arranged coaxially;
    condenser means for condensing the modulated coaxial beam to a recording layer of the duplication master; and
    hologram-forming-position moving means for moving a position of the recording layer where a hologram is formed due to interference between the master-producing reference beam and the modulated coaxial beam,
    wherein the duplication master has a recording layer in which a hologram is recorded, and a polarization-dependent angle selective film, the polarization-dependent angle selective film being configured to have a transmittance sufficient for forming the hologram with respect to a light beam having a predetermined polarization direction irrespective of an incidence angle, and to have a transmittance that changes in accordance with an incidence angle of a light beam with respect to a polarization direction different from the predetermined polarization direction, and the master-producing reference beam and the modulated coaxial beam that are polarized in the predetermined polarization direction are radiated to the duplication master.

3. The apparatus for producing a duplication master according to claim 1 or 2, wherein the condenser means includes an objective lens and a dummy glass, and the dummy glass corrects for an aberration generated when duplicating the duplicate hologram recording medium in advance.

4. The apparatus for producing a duplication master according to claim 1 or 2, wherein the condenser means is formed by an objective lens that condenses the modulated coaxial beam to a recording layer of the duplication master, the objective lens having an aberration that corrects for an aberration generated when duplicating the duplicate hologram recording medium in advance.

5. The apparatus for producing a duplication master according to claim 1 or 2, wherein the hologram-forming-position moving means has a spindle motor that causes the duplication master formed in a disc shape to rotate about its center point.

6. The apparatus for producing a duplication master according to claim 5, wherein an incidence direction of the master-producing reference beam is moved in synchronization with a rotation angle of a spindle-motor rotating shaft of the spindle motor.

7. The apparatus for producing a duplication master according to claim 5, wherein an incidence direction of the master-producing reference beam, a position of a prism, a position of the modulated coaxial beam about an optical axis, and an image displayed on the spatial light modulator are rotated in synchronization with a rotation angle of a spindle-motor rotating shaft of the spindle motor.

8. An apparatus for producing a duplication master used for duplicating a hologram carrying recording data onto a duplicate hologram recording medium, comprising:

a beam splitter that splits a light beam from a laser light source into a coaxial beam and a master-producing reference beam;

a spatial light modulator that performs spatial light modulation on the coaxial beam to generate a modulated coaxial beam in which a predetermined reference beam and a signal beam corresponding to recording data are arranged coaxially;

a condenser section condensing the modulated coaxial beam to a recording layer of the duplication master while correcting for an aberration generated when duplicating the duplicate hologram recording medium in advance; and a hologram-forming-position moving section moving a position of the recording layer where a hologram is formed due to interference between the master-producing reference beam and the modulated coaxial beam.

9. An apparatus for producing a duplication master used for duplicating a hologram carrying recording data onto a duplicate hologram recording medium, comprising:

a beam splitter that splits a light beam from a laser light source into a coaxial beam and a master-producing reference beam;

a spatial light modulator that performs spatial light modulation on the coaxial beam to generate a modulated coaxial beam in which a predetermined reference beam and a signal beam corresponding to recording data are arranged coaxially;

a condenser section condensing the modulated coaxial beam to a recording layer of the duplication master; and a hologram-forming-position moving section moving a position of the recording layer where a hologram is formed due to interference between the master-producing reference beam and the modulated coaxial beam, wherein the duplication master has a recording layer in which a hologram is recorded, and a polarization-dependent angle selective film, the polarization-dependent angle selective film being configured to have a transmittance sufficient for forming the hologram with respect to a light beam having a predetermined polarization direction irrespective of an incidence angle, and to have a transmittance that changes in accordance with an incidence angle of a light beam with respect to a polarization direction different from the predetermined polarization direction, and the master-producing reference beam and the modulated coaxial beam that are polarized in the predetermined polarization direction are radiated to the duplication master.

* * * * *